(12) United States Patent
Hieda et al.

(10) Patent No.: US 7,115,208 B2
(45) Date of Patent: Oct. 3, 2006

(54) METHOD OF MANUFACTURING RECORDING MEDIUM

(75) Inventors: Hiroyuki Hieda, Yokohama (JP); Masatoshi Sakurai, Tokyo (JP); Koji Asakawa, Kawasaki (JP); Toshiro Hiraoka, Fujisawa (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 30 days.

(21) Appl. No.: 11/000,170

(22) Filed: Dec. 1, 2004

(65) Prior Publication Data

US 2005/0094549 A1   May 5, 2005

Related U.S. Application Data

(62) Division of application No. 10/102,812, filed on Mar. 22, 2002, now Pat. No. 6,977,108.

(30) Foreign Application Priority Data

Mar. 22, 2001   (JP)   ............... 2001-082436

(51) Int. Cl.
  *B44C 1/22*   (2006.01)
  *G11B 5/127*  (2006.01)
(52) U.S. Cl. ............... 216/22; 216/41; 430/312; 430/322; 428/64.2; 29/603.01; 29/603.03
(58) Field of Classification Search ............... 216/22, 216/41, 42; 428/64.2; 360/313; 29/603.01, 29/603.03
  See application file for complete search history.

(56) References Cited

U.S. PATENT DOCUMENTS

| | | | |
|---|---|---|---|
| 4,052,711 A | 10/1977 | Lin et al. | |
| 5,317,468 A | 5/1994 | Wakabayashi et al. | |
| 5,411,630 A * | 5/1995 | Nagase et al. | 216/22 |
| 5,587,223 A | 12/1996 | White | |
| 5,590,009 A | 12/1996 | Ishida | |
| 5,604,013 A | 2/1997 | Yamaguchi et al. | |
| 5,956,216 A | 9/1999 | Chou | |
| 5,981,054 A | 11/1999 | Hikosaka et al. | |
| 6,021,013 A | 2/2000 | Albrecht et al. | |
| 6,162,532 A | 12/2000 | Black et al. | |
| 6,168,845 B1 | 1/2001 | Fontana et al. | |
| 6,249,396 B1 | 6/2001 | Gray | |
| 6,387,530 B1 | 5/2002 | Liu et al. | |
| 6,421,195 B1 | 7/2002 | Rubin et al. | |

(Continued)

FOREIGN PATENT DOCUMENTS

JP   62-202303   9/1987

(Continued)

OTHER PUBLICATIONS

JPO Abstract Translation of JP 2000-195036A (JPO Doc. ID: JP 2000195036 A).

(Continued)

*Primary Examiner*—Shamim Ahmed
(74) *Attorney, Agent, or Firm*—Oblon, Spivak, McClelland, Maier & Neustadt, P.C.

(57) ABSTRACT

A recording medium includes a substrate, and a recording layer formed on the substrate having (a) a recording track band, and (b) recording cells regularly arrayed in the recording track band to form a plurality rows of sub-tracks. The recording cells included in each sub-track are formed apart from each other at a pitch P in the track direction. Nearest neighboring two recording cells, each positioned on adjacent two sub-tracks in the track band, are formed apart from each other at a pitch P/n in the track direction, where $2 \leq n \leq 5$.

11 Claims, 20 Drawing Sheets

U.S. PATENT DOCUMENTS

| | | |
|---|---|---|
| 6,537,638 B1 | 3/2003 | Do et al. |
| 6,602,620 B1 | 8/2003 | Kikitsu et al. |
| 6,661,592 B1 | 12/2003 | Richter et al. |

FOREIGN PATENT DOCUMENTS

| | | |
|---|---|---|
| JP | 63-261578 | 10/1988 |
| JP | 3-028559 U | 3/1991 |
| JP | 10-255258 | 9/1998 |
| JP | 2000-195034 | 7/2000 |
| JP | 2000-195036 | 7/2000 |
| JP | 2000-195036 A | 7/2000 |
| JP | 2000-215441 | 8/2000 |
| JP | 2000-251236 | 9/2000 |

OTHER PUBLICATIONS

Machine Translation of JP 2000-195036 A.

R. A. Segalman, et al., "Controlling the Long Range Ordering of Block Copolymer Micelle Filma[1]", Abstract Submitted for the MAR00 Meeting of The American Physical Society, Nov. 30, 1999, 2 pages.

* cited by examiner

METHOD OF MANUFACTURING RECORDING MEDIUM

CROSS-REFERENCE TO RELATED APPLICATIONS

This application is a divisional of U.S. application Ser. No. 10/102,812, filed Mar. 22, 2002 now U.S. Pat. No. 6,977,108, and is based upon and claims the benefit of priority from the prior Japanese Patent Application No. 2001-082436, filed Mar. 22, 2001, the entire contents of each of which are incorporated herein by reference.

BACKGROUND OF THE INVENTION

1. Field of the Invention

The present invention relates to a recording medium capable of high-density recording, a method of manufacturing a recording medium, and a recording apparatus.

2. Description of the Related Art

Information handled by users is being markedly increased by drastic improvement in functions of information apparatuses such as personal computers. Under the circumstances, demands for an information recording-reproducing apparatus with a drastically improved recording density are being made higher and higher. In order to improve the recording density, it is necessary to miniaturize the size of a single recording cell or a recording mark, which constitutes the writing unit of recording on the recording medium. However, the miniaturization of the recording cell or the recording mark faces a series difficulty in the conventional recording medium.

For example, in a magnetic recording medium such as a hard disk, a polycrystalline material having a wide grain size distribution is used for forming the recording layer. However, the recording is rendered unstable in the recording layer formed of small polycrystalline grains because of thermal fluctuations of the crystal. Therefore, if the recording cell is small, recording is rendered unstable and noise generation is increased, though a problem is not generated in the case where the recording cell is large. The unstable recording and the increased noise generation are brought about because, if the recording cell is small, the number of crystals contained in the recording cell is rendered small and interaction among the recording cells is rendered relatively large.

This is also the case with an optical recording medium using a phase change material. Specifically, recording is rendered unstable and medium noise is increased in a recording density not lower than several hundred gigabits per square inch, in which the recording mark size is substantially equal to the grain size of the phase change material.

In order to avoid the difficulties pointed out above, proposed in the field of the magnetic recording is a patterned media, in which a recording material is divided in advance by a non-recording material so as to carry out a recording-reproducing by using a single recording material particle as a single recording cell, as disclosed in, for example, U.S. Pat. Nos. 5,587,223, 5,956,216 and 6,162,532.

However, a lithography technique is used in the conventional method of forming the structure in which the recording material particles are isolated. It is certainly possible for optical lithography to cope with the requirement of a high recording density in terms of throughput because single step exposure can be employed. However, the optical lithography is hard to process recording cells sufficiently small in size. Electron beam lithography or a focused ion beam permit fine processing of about 10 nm. However, it is difficult to put these techniques into practical use in view of the processing cost and the processing speed.

Japanese Patent Application Laid-open Publication No. 10-320772 discloses a method of manufacturing a magnetic recording medium having isolated magnetic fine particles formed on a substrate by lithography technology using a mask of fine particles having a size of several nanometers to several micrometers, which are two-dimensionally arrayed on a substrate. The method provides a cheap manufacturing method of a patterned media.

A method of ordering fine particles two-dimensionally on a substrate is proposed in, for example, S. Hung et al., Jpn. J. Appl. Phys., 38 (1999) pp. L473–L476. It is proposed that a substrate is coated with fine particles covered with long-chain alkyl groups so as to permit a relatively uniform single particle layer to be formed to cover a large area by utilizing autoagglutination of the fine particles during drying.

Also known is a method of forming a regular array structure on a substrate by utilizing a self-ordering phase separation structure formed by a block copolymer, as reported in, for example, M. Park et al., Science 276 (1997) 1401. It is reported that, in a block copolymer such as polystyrene-block-polybutadiene or polystyrene-block-polyisoprene, it is possible to leave the polystyrene block alone by ozone treatment, and to form a structure of holes or a line-and-space on the substrate by using the left polystyrene block as an etching mask.

In a film-forming method in which self-ordering particles such as fine particles or block copolymer are arrayed two-dimensionally on a substrate, it is possible to obtain a structure in which the self-ordering particles are microscopically arrayed to form a lattice. However, many defects and crystal boundaries are present macroscopically so as to form a lattice directed at random, resulting in failure to achieve practical recording/reproducing.

Also, in the conventional magnetic recording medium having a uniform structure, signals are written at a predetermined interval. Therefore, even if a write error takes place, the recording cells are rendered defective only partly, making it possible to read out the written information at the same time interval in the entire system. On the other hand, when it comes to the patterned media in which the recording cells are formed in advance, it is necessary to perform the processing such that the distances between the adjacent recording cells are rendered constant. Even if it is possible to manufacture a patterned media utilizing the self-ordering particles, it is necessary to form a single regular array free from an internal disturbance or defect in the entire region. However, where ordering processes have taken place from two different sites within the same region, a regular triangular lattice is formed inside each of the self-ordering array. However, the lattice position of one of these two self-ordering arrays does not match with the lattice position of the other self-ordering array. As a result, discontinuity of the lattices is generated in the connecting area of the adjacent self-ordering arrays. Since the read interval of the recording cells differs in the discontinuous portion of the lattices, reproduction of information is rendered difficult. As described above, a region where the array is disturbed is generated as a defect inherent in the recording medium utilizing the self-ordering array, with the result that it is necessary to establish a method of avoiding read errors for using the particular recording medium.

It should also be noted that the track density is increased with increase in the recording density so as to make it very difficult to write servo marks for tracking. A method of achieving a high track density is proposed in, for example, Japanese Patent Application Laid-open Publication No. 6-111502. It is proposed that a servo pattern for tracking is formed in advance in the disk as a physical irregular pattern. In this method, formed is a track close to a true circle, making it possible to increase the track density, compared with the conventional HDD. However, when it comes to a high recording density such as 100-giga(G) bpsi to 1-tera(T) bpsi, it is difficult to form the servo pattern by cheap lithography. Further, in the recording medium utilizing the self-ordering, a regular array structure inherent in the self-ordering particles is formed in the track. It follows that it is impossible for the conventional tracking method to access the recording cells formed of self-ordering particles.

As described above, patterned media are an effective means for realizing a high recording density of the order of Tbpsi. However, a method that permits the manufacture of a pattern with a low cost and with a high throughput has not yet been established. Also, the method using the self-ordering of a material permits the manufacture of a pattern with a low cost and with a high throughput. However, a medium having an entirely arrayed structure to permit access to recorded data has not yet been obtained.

BRIEF SUMMARY OF THE INVENTION

An object of the present invention is to provide a recording medium in which a pattern of the recording cells is highly arrayed, which can be manufactured easily, and which permits reading information with a high speed, a method of manufacturing the particular recording medium, and a recording apparatus.

According to one aspect of the present invention, there is provided a recording medium, comprising: a substrate; and a recording layer formed on the substrate comprising (a) a recording track band, and (b) recording cells regularly arrayed in the recording track band to form a plurality rows of sub-tracks, wherein the recording cells included in each sub-track are formed apart from each other at a pitch P in the track direction, and wherein nearest neighboring two recording cells, each positioned on adjacent two sub-tracks in the track band, are formed apart from each other at a pitch P/n in the track direction, where $2 \leq n \leq 5$.

According to another aspect of the present invention, there is provided a method of manufacturing a recording medium, comprising: forming on a substrate a continuous or intermittent groove region, or a band region containing a specified chemical component, which corresponds to a recording track band; forming a two-dimensional regular array structure of self-ordering molecules or fine particles in the groove region or the band region; and forming recording cells corresponding to the regular array structure.

In this method, optical lithography, electron beam lithography or nano-imprinting lithography is employed for forming the groove region or the band region.

According to another aspect of the present invention, there is provided a recording apparatus, comprising: a recording medium comprising a substrate and a recording layer formed on the substrate comprising (a) a recording track band and (b) recording cells regularly arrayed in the recording track band to form a plurality rows of sub-tracks, wherein the recording cells included in each sub-track are formed apart from each other at a pitch P in the track direction, and wherein nearest neighboring two recording cells, each positioned on adjacent two sub-tracks in the track band, are formed apart from each other at a pitch P/n in the track direction, where $2 \leq n \leq 5$; a write head; and a read head.

According to another aspect of the present invention, there is provided a recording apparatus writing to and reading from a recording medium comprising a substrate and a recording layer formed on the substrate comprising (a) a recording track band and (b) recording cells regularly arrayed in the recording track band to form a plurality rows of sub-tracks, wherein the recording cells included in each sub-track are formed apart from each other at a pitch P in the track direction, and wherein nearest neighboring two recording cells, each positioned on adjacent two sub-tracks in the track band, are formed apart from each other at a pitch P/n in the track direction, where $2 \leq n \leq 5$, comprising; a write head; a read head; and a controller controlling write timing signals supplied to the write head in accordance with signals generated from the read head.

DETAILED DESCRIPTION OF THE INVENTION

Figure 1:
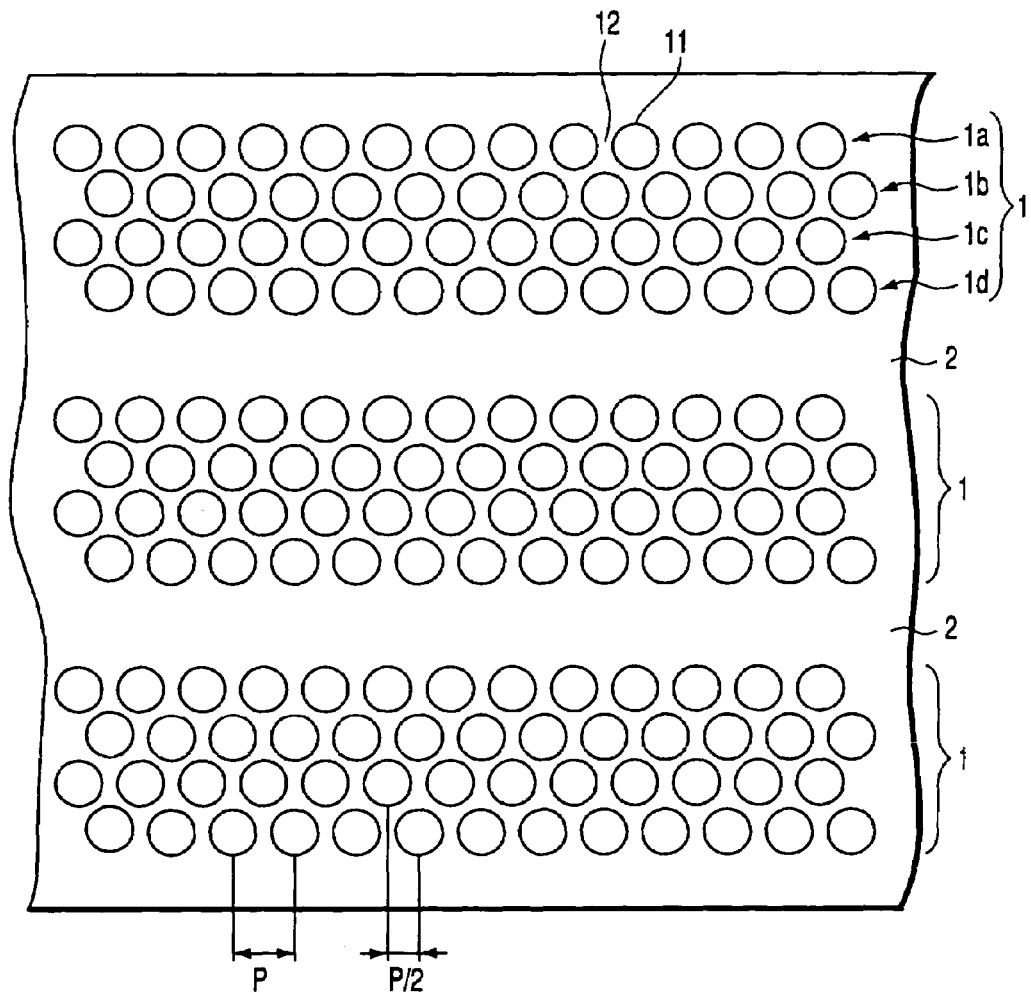
FIG. 1 is a plan view showing a recording medium according to one embodiment of the present invention.

FIG. 1 is a plan view showing the construction of the recording layer formed on a substrate included in the recording medium according to one embodiment of the present invention. As shown in the drawing, a plurality of recording track bands 1 is formed in the recording layer, the recording track bands 1 being separated from each other by band-like isolation regions 2. The shape of the entire recording medium is not particularly limited in the present invention. It is possible for the entire recording medium to be shaped like a disk or like a card. In the case of a disk-type recording medium, it is desirable to form the recording track bands 1 concentrically or spirally, where the track direction is the circumferential direction. On the other hand, in the case of a card-type recording medium, it is desirable to form linearly the recording track bands 1.

In the recording track band 1, regularly arrayed recording cells are separated from each other by a matrix 12 formed of a non-recording material. The material of the matrix 12 is not particularly limited, as far as information written in the recording cells 11 is not destroyed. For example, it is possible to use an inorganic insulating material such as $SiO_2$ or $Al_2O_3$, or an organic insulating material such as a polymer as the material of the matrix 12.

The recording cells 11 are periodically arrayed in the track direction with a pitch P so as to form a sub-track, and a plurality rows of sub-tracks are included in a single recording track band 1. In FIG. 1, four rows of the sub-tracks 1a to 1d are included in the single recording track band 1. As apparent from FIG. 1, nearest neighboring two recording cells, each positioned on adjacent two sub-tracks, for example the sub-track 1a and 1b, are formed apart from each other at a pitch P/n in the track direction, where $2 \leq n \leq 5$. Namely, the distance in the track direction between the center of the recording cell 11 in the sub-track 1a and the center of the adjacent recording cell 11 in the sub-track 1b is equal to 1/n, where $2 \leq n \leq 5$, of the pitch P of the recording cells in one sub-track. In FIG. 1, the recording cells 11 form the most stable structure of the hexagonal close-packed structure so as to form a triangular lattice. Therefore, the nearest neighboring two recording cells 11 included in the adjacent sub-tracks are deviated by P/2 from each other in the track direction.

In the recording medium of the particular construction, it suffices for the recording cells 11 to be regularly arrayed with packed in a high-density within a limited region of the recording track band 1, not within the entire surface of the substrate. It follows that it is possible to manufacture the recording medium stably and with a low cost by using self-ordering particles.

Note that, if n is larger than 2, the possibility of superposition of the recording cells positioned on the adjacent sub-tracks in the track direction is made high. In this case, it is necessary to reduce the size of the recording cells in order to discriminate the recording cells positioned on the adjacent sub-tracks. On the other hand, when n equals to 2, it is easy to discriminate the recording cells positioned on the adjacent sub-tracks even if the size of the recording cells is made large.

It is desirable for the recording cell size to fall within a range of between 2 nm and 100 nm. It is more desirable for the recording cell size to fall within a range of between 2 nm and 20 nm, because the recording density is increased as the recording cell size is reduced. The recording cells have substantially the same size. It is also desirable for the pitch P between the recording cells to fall within a range of between 2 nm and 100 nm. Note that, the pitch P between the recording cells is larger than the recording cell size so that the recording cells are separated from each other. It is also desirable for the recording cell to be circular, elliptical, oblong or square in its cross section because the recording cells can be packed in a high-density. Particularly, it is desirable for the recording cell to be circular because the circular recording cells can be formed easily by the self-ordering. Further, it is desirable for the recording cell to have a hexagonal close-packed structure. It should be noted in this connection that the hexagonal close-packed structure is the most stable structure in the self-ordering of the fine particles. In addition, the recording cells having the hexagonal close-packed structure have the smallest defects and can be manufactured at a low cost.

It is possible for the isolation region 2 arranged between the adjacent recording track bands 1 to be formed of a non-recording material or a recording material equal to that of the recording cells.

If the isolation region 2 is formed of a non-recording material, seek operation for the recording track band can be easily performed by utilizing the phenomenon that a region where no signal is provided appears periodically every time the read head crosses a plurality of recording track bands.

If the isolation region 2 is formed of a recording material equal to that of the recording cells, it is possible to detect tracking signals from the isolation region 2 and to record address information for the recording track band in the isolation region 2.

In the recording medium of the present invention, it is possible for the regular array of the recording cells to be formed in all the regions where information is written. It is also possible that address signal regions are formed in advance and the regularly arrays of the recording cells to be formed as data regions. Further, it is possible for the regular arrays of the recording cells to be formed in advance in only the servo mark regions for tracking. In this case, it is possible to form, for example, a multigrain magnetic thin film in the regions where information is written or from which information is read out. In recent years, a long time is required for servo writing and, thus, the method of forming servo marks in advance is highly effective.

The recording principle of the recording medium used in the embodiments of the present invention is not particularly limited. In other words, recording media based on various recording principles can be used in the embodiments of the present invention. For example, the recording medium includes a magnetic recording medium, a phase change optical recording medium, a ferroelectric medium, a charge-storing medium or a recording medium containing an organic dye of a fluorescent compound. Preferable recording medium is the magnetic recording medium or the phase change optical recording medium. Particularly preferable recording medium is a perpendicular magnetic recording medium capable of achieving a high recording density.

Magnetic recording materials include, for example, crystalline materials such as Ni—Fe and Fe—Al—Si, Co-based amorphous materials such as Co—Zr—Nb, and Fe-based microcrystalline materials such as Fe—Ta—N, as well as Fe, Co, Fe—Co, Fe—Pt, Co—Pt, Co—Cr, Co—Ni, Ba ferrite and Co oxide.

Inorganic phase change optical recording materials include, for example, Sb—Se, Sb—Te, Ga—Se, Te—Se—Sb, Te—Ga—Se, Te—Ge—Sn, Te—As—Ge, Cs—Te, Ge—Sb—Te, Ag—In, and In—Sb—Te.

Recording materials for the charge-storing media include a metal, a semiconductor, a conductive polymer, and an organic dye. The charge-storing medium has a structure that an underlying electrode, an insulating layer and a recording layer are formed on a substrate.

Organic dyes are used for various recording media and include, for example, a dye for the electric charge recording, a dye for the phase change recording, a dye for the write-once type recording, a photochromic dye, a fluorescent dye, and a photorefractive dye. Where recording is performed based on the presence or absence of electric charges by using an organic dye medium, used are dye molecules having donor or acceptor properties. In the case of performing recording on the basis of the phase change between the crystalline state and the amorphous state, used are dye molecules having a high crystallization speed. The write-once type dye is a material which is irreversibly changed upon light absorption or which irreversibly changes the surrounding upon light absorption. Where fluorescence is used for reading, it is desirable to use a fluorescent dye emitting intense fluorescence. It is also possible to use a photochromic compound as an organic dye whose absorption is changed by light. Specific examples of organic dyes are disclosed in, for example, Japanese Patent Application Laid-open Publication No. 11-328725.

Fluorescent compounds include both an organic fluorescent compound and an inorganic fluorescent compound. In general, fluorescent life of the inorganic compound is longer than that of the organic compound and, thus, it is desirable to use the organic compound for high-speed reading.

Photochromic compounds include, for example, spirooxazines, diarylethenes, fulgides, indigos, spiropyrans, cyclophans, chalcones, and condensed polycyclic compounds.

A method for manufacturing a recording medium according to embodiments of the present invention comprises: forming on a substrate a continuous or intermittent groove region, or a band region containing a specified chemical component, which corresponds to a recording track band; forming a two-dimensional regular array structure of self-ordering molecules or fine particles in the groove region or the band region; and forming recording cells corresponding to the regular array structure.

In the case of using a groove structure having an irregularity, it is possible to realize a regular array along the groove by interrupting a crystal domain of self-ordering particles on the stepped portion of the irregularity.

In the case of using the band region prepared by patterning the specified chemical compound, it is possible to form regions where the self-ordering particles are adsorbed and are not adsorbed by selecting appropriately the chemical surface state of the self-ordering particles and the surface state of the chemical component of the band region. The regular array takes place only in the portion where the self-ordering particles are adsorbed so as to make it possible to obtain a regular array along the band structure. Also, by varying interaction between the self-ordering particles and the surface by a chemical pattern, it is possible to obtain a desired regular array only on a chemical pattern in which certain interaction takes place while failing to obtain a regular array on another chemical pattern so as to lead to a random arrangement. It is preferable to make the width of the band structure sufficiently smaller than the size of the regular array naturally formed by the self-ordering particles in the case where the band structure is not present. If the particular condition is satisfied, it is possible to form the structure in which the self-ordering particles are regularly arrayed in the width direction of the band structure.

It is desirable for the self-ordering particle to have a size falling within a range of between 2 nm and 100 nm, more desirably between 2 nm and 20 nm. It is also desirable for the self-ordering particle to be circular, elliptical, oblong or square corresponding to the shape of the recording cells described above. In particularly, it is desirable for the self-ordering particle to be circular because the circular particles can be formed easily by self-ordering.

Where it is intended to realize a recording density on the order of Tbpsi by the recording medium according to embodiments of the present invention, the width of the groove structure or the band structure is determined as follows. Where, for example, two rows of recording cells are present in a single recording track band, the width of the groove structure or the band structure is about 40 nm, which is the size that can be formed by ordinary electron beam lithography. Since more than two rows of sub-tracks can be actually formed in a single recording track band, it is possible to utilize lithography techniques which are cheaper and permit a higher throughput, but show low resolution. The lithography that can be utilized in the embodiments of the present invention includes, for example, optical lithography, electron beam lithography, a method using a scanning probe such as an atomic force microscope, a scanning tunneling microscope or a near-field microscope, and a nano-imprinting lithography (P. R. Krauss, et al., J. Vac. Sci. Technol. B13 (1995), pp. 2850).

The self-ordering particles that can be utilized in the embodiments of the present invention include, for example, a block copolymer or fine particles of a polymer, a metal, a semiconductor, or an oxide having a size falling within a range of between several nanometers and 100 nanometers.

In the case of using a block copolymer, used is a block copolymer having a block that can be removed selectively among two or more blocks after formation of the self-ordering particles. In this case, it is desirable to utilize difference in etching rate among the blocks in RIE or another etching method.

In the case of using, for example, a block copolymer comprising a polystyrene block and a polybutadiene block, it is possible to adopt development such that the polystyrene block alone is left by ozone treatment. In a block copolymer comprising a polystyrene block and a polymethyl methacrylate block, the polystyrene block exhibits an etching resistance higher than that of the polymethyl methacrylate block against reactive ion etching (RIE) using $CF_4$ as an etchant so as to make it possible to remove selectively by RIE the polymethyl methacrylate block and the recording layer under the polymethyl methacrylate block (K. Asakawa et al., APS March Meeting, 2000).

The block copolymers utilized in the embodiments of the present invention include, for example, polybutadiene-block-polydimethylsiloxane, polybutadiene-block-4-vinyl pyridine, polybutadiene-block-methyl methacrylate, polybutadiene-block-poly-t-butyl methacrylate, polybutadiene-block-poly-t-butyl acrylate, poly-t-butyl methacrylate-block-poly-4-vinyl pyridine, polyethylene-block-polymethyl methacrylate, poly-t-butyl methacrylate-block-poly-2-vinyl pyridine, polyethylene-block-poly-2-vinyl pyridine, polyethylene-block-poly-4-vinyl pyridine, polyisoprene-block-poly-2-vinyl pyridine, polymethyl methacrylate-block-polystyrene, poly-t-butyl methacrylate-block-polystyrene, polymethyl acrylate-block-polystyrene, polybutadiene-block-polystyrene, polyisoprene-block-polystyrene, polystyrene-block-poly-2-vinyl pyridine, polystyrene-block-poly-4-vinyl pyridine, polystyrene-block-polydimethyl siloxane, polystyrene-block-poly-N,N-dimethyl acrylamide, polybutadiene-block-polysodium acrylate, polybutadiene-block-polyethylene oxide, poly-t-butyl methacrylate-block-polyethylene oxide, polystyrene-block-polyacrylate, and polystyrene-block-polymethacrylate. In addition to these AB-type diblock copolymers exemplified above, it is also possible to use ABA-type triblock copolymers.

In the case of using a block copolymer, it is desirable to use those having a component ratio that permits forming a micellar structure or a cylinder structure on the substrate surface. In this case, it is possible to form circular recording cells separated from each other and arrayed regularly. It is possible to form a film of the block copolymer by, for example, spin coating of a solution prepared by dissolving the block copolymer in a suitable solvent such as toluene. In general, phase separation of the block copolymer into a self-ordering array can be obtained by applying annealing treatment under temperatures not lower than the glass transition point of the material.

In the case of using fine particles made of a polymer or a metal and having a size of scores of nanometers, a self-ordering regular array can be formed by applying a solution including the fine particles dispersed therein from above a disk having a band structure formed therein, followed by drying the solution so as to remove the solvent and subsequently removing excessively adsorbed fine particles by using a suitable solvent. It is also possible to form a regular array by dipping a disk substrate in a solution including fine particles dispersed therein for a certain time so as to permit the fine particles to be adsorbed on the disk substrate.

After formation of the regular array of the self-ordering particles by the method described above, it is possible to form rows of recording cells, which are regularly arranged as desired, by etching the underlying recording layer formed in advance by means of, for example, ion milling with the self-ordering particles used as a mask. In order to etch off the recording layer with a high aspect ratio, it is effective to form a film of $SiO_2$ or Si between the recording layer and the self-ordering particle layer, followed by transferring the regular array pattern of the self-ordering particles by, for example, RIE onto the film of $SiO_2$ or Si and subsequently processing the recording layer. Since the film of $SiO_2$ or Si can be etched off by RIE with a high aspect ratio, it is possible to etch the recording layer with a high aspect ratio by using the film of $SiO_2$ or Si as a mask.

As described above, it is possible to manufacture patterned media having recording cells buried in a matrix by covering the regular array of the recording cells with a matrix material and by polishing the surface so as to planarize the surface.

It is also possible to form recording cells by forming regularly arrayed fine pores in a matrix with the self-ordering particles used as a mask, followed by filling the pores with a recording material. In this case, a film of a matrix material is formed first on a disk substrate. Then, formed is a resist layer for forming a groove structure for controlling the array of the self-ordering particles or for forming a band structure prepared by patterning a specified chemical component. Further, a groove structure or a band structure is formed in the resist layer by lithography. After formation of a film for self-ordering particles, annealing treatment is applied for providing regularly arrayed particles. Further, etching treatment is applied with the self-ordering particles used as a mask so as to form holes in the matrix. After removal of the resist layer, the holes are filled with a recording material. It is possible to remove the resist layer after the deposition of the recording material. It is also possible to leave the resist layer without removing for use as it is.

It suffices for the resist material not to destroy the recording layer, to be capable of forming a structure by lithography, and not to be damaged by formation of a film for self-ordering particles and by treatment for the regular array. Examples of self-ordering particles include those formed from a block copolymer and fine particles of a polymer, a metal, a semiconductor or an oxide having a size of scores of nanometers. It is also possible to use a fine pore array of $Al_2O_3$ formed by anodic oxidation applied to Al.

In the case of using a block copolymer, used is a block copolymer from which the block forming a micell or a cylinder can be removed selectively for forming holes in the matrix material.

In the case of using fine particles formed of a polymer or a metal, a negative pattern of the pattern formed of the fine particles is used as a mask for forming holes in the matrix material. To be more specific, after deposition of a material capable of forming an etching mask such as a metal on the fine particle array, the fine particles are removed so as to expose the underlying matrix layer only in the portions where the fine particles have been present and to process the exposed portions of the underlying matrix layer.

In the case of using a fine pore array of $Al_2O_3$ formed by anodic oxidation applied to Al, an Al film is formed on a band structure of a film in which a matrix is exposed in a concave portion, followed by removing the film and the Al film thereon so as to obtain a band structure of Al. Then, the band structure of Al is subjected to anodic oxidation so as to obtain a fine pore array of $Al_2O_3$ regularly arrayed within the band structure. Further, the fine pore array is transferred to the underlying matrix with the fine pore array of $Al_2O_3$ used as a mask.

Also, in the case of using a fine pore array of $Al_2O_3$, it is possible to use the fine pore array of Al itself as a matrix. In this case, after formation of an Al film, formed is a pattern of a film in which Al is exposed in the concave portion of the groove structure. If the pattern thus formed is subjected to anodic oxidation, the reaction proceeds only in the portion where Al is exposed so as to obtain a fine pore array of $Al_2O_3$ arrayed along the band structure.

Also, a position-controlled fine pore array can be formed in anodic oxidation of Al by imparting in advance fine pores to the surface to be subjected to the anodic oxidation. It is also possible to manufacture a regularly arrayed $Al_2O_3$ fine pore array by forming a groove structure on an Al film, by forming regularly arrayed fine pores on the Al surface by etching with a self-ordering film such as a block copolymer used as a mask, and by subjecting the Al to anodic oxidation after removal of the self-ordering film.

It is possible to obtain separated recording cells by forming a film of a recording material on the regular array of fine pores formed in the matrix, followed by polishing the film of the recording material thus formed.

Further, it is possible to employ a method of preparing a stamp master having irregularity by the method using the self-ordering particles, followed by transferring the pattern to a disk substrate by nano-imprinting lithography utilizing the stamp master.

In the first step, formed on a substrate is a resist layer for forming a groove structure for controlling the array of the self-ordering particles or for forming a band structure by pattering a specified chemical component. Then, a groove structure or a band structure is formed in the resist layer by lithography. After formation of a film for self-ordering particles, a regular array is formed by, for example, annealing treatment. Further, etching is applied with the self-ordering particles used as a mask so as to prepare a stamp master. On the other hand, a resist film used as a mask is formed on a substrate having a recording layer or a matrix film formed thereon. The pattern of the stamp master is transferred to the resist film by pressing the stamp master against the resist film while heating the stamp master. Then, a recording medium is obtained via a process of forming a recording cell array or a fine pore array within the matrix by etching.

It is also possible to employ a manufacturing method in which fine particles formed of a recording material are arranged directly within a band structure so as to use the fine particles as the recording cells. It is possible to form a self-ordering regular array by applying a solution including fine particles of a recording material dispersed therein from above a substrate having a band structure formed therein, followed by drying the solution so as to remove the solvent and subsequently removing excessively adsorbed fine particles by using a suitable solvent. It is also possible to form a regular array by dipping a substrate in a solution including fine particles dispersed therein for a certain time so as to permit the fine particles to be adsorbed on the substrate. After formation of the recording cells in this fashion, it is possible to manufacture a recording medium by covering the recording cells with a binder or a material forming a protective film so as to prevent the fine particles from being peeled off the substrate.

In the method described above, it is possible to regularly array the self-ordering particles over a large area along the band structure by applying a re-arraying treatment such as annealing treatment. Where it is difficult to apply such a re-arraying treatment, it is possible to obtain a regular array structure in which particles are perfectly aligned in a desired direction within the band structure of a small area by intermittently forming an irregular structure or a chemical pattern in the longitudinal direction of the band. In other words, it is possible to form a two-dimensional crystal structure of the self-ordering particles, which is of a completely uniform structure free from grain boundaries within the band structure having a predetermined length.

A recording apparatus according to one embodiment of the present invention comprises: a recording medium comprising a substrate and a recording layer formed on the substrate comprising (a) a recording track band and (b) recording cells regularly arrayed in the recording track band to form a plurality rows of sub-tracks, wherein the recording cells included in each sub-track are formed apart from each other at a pitch P in the track direction, and wherein nearest neighboring two recording cells, each positioned on adjacent two sub-tracks in the track band, are formed apart from each other at a pitch P/n in the track direction, where $2 \leq n \leq 5$; a write head; and a read head.

In the recording apparatus described above, it is possible to use detection signals themselves generated from the recording cells as tracking signals by utilizing the deviation of the recording cells on the adjacent sub-tracks so as to make it possible to increase a tracking sampling frequency. As a result, it is possible to perform tracking by the read head even if the size of the recording cells is made 100 nm or less. Also, since it is possible to lower the error rate, it is possible to widen data regions.

The regular array by self-ordering forms a close-packed structure and, thus, forms a triangular lattice in many cases. If the regular array of the triangular lattice is formed in the track direction, the recording cells on the two adjacent sub-tracks are deviated from each other in the track direction such that the distance between the center of the recording cell in one sub-track and the center of the recording cell in the adjacent sub-track is rendered equal to ½ of the pitch P of recording cells forming a single line of the sub-track. It follows that, where a read head large enough to cover the two adjacent sub-tracks is used, it is possible to detect alternately reproduce signals generated from the two sub-tracks and to distinguish the reproduce signals thus detected. This implies that it is possible to double the effective track density, which is effective for increasing a track density.

The recording apparatus according to another embodiment of the present invention is configured to write to and read from a recording medium comprising a substrate and a recording layer formed on the substrate comprising (a) a recording track band and (b) recording cells regularly arrayed in the recording track band to form a plurality rows of sub-tracks, wherein the recording cells included in each sub-track are formed apart from each other at a pitch P in the track direction, and wherein nearest neighboring two recording cells, each positioned on adjacent two sub-tracks in the track band, are formed apart from each other at a pitch P/n in the track direction, where $2 \leq n \leq 5$. The recording apparatus comprises a write head, a read head, and a controller controlling write timing signals supplied to the write head in accordance with signals generated from the read head.

The recording apparatus is capable of preventing the write head from writing to a region where no recording cell is present.

The aforementioned controller controls the write timing signals supplied to the write head, for example, by comparing (a) a time interval determined by the pitch of the recording cells regularly arrayed in the track direction and a traveling speed of the read head with (b) a time interval of signals generated from the read head.

In the recording apparatus having such a controller, it is possible to write while avoiding a defective region even if there is the defective region in the regular array by self-ordering so as to bring about discontinuity in the sub-track formed within the recording track band.

To be more specific, in the recording apparatus, the recorded information is read out at a time interval T determined by the lattice distance of the recording cells and the traveling speed of the head (relative speed between the read head and the recording medium) in the region where the recording cells are regularly arrayed. However, the time interval of the signals read by the read head is disturbed in the defective region of the recording cells. Therefore, in this case, the signals read by the head is not processed as information temporarily. When the signal generation is started again at the time interval T, the signals read out at that time are processed again as information, and writing is also started again.

It is possible to set arbitrarily the criteria for judging that the read head is traveling over a defective region on the basis of the disturbance in the time interval of the signals generated from the read head. For example, it is judged that the read head is traveling over a defective region in the case where signals are detected in an unreasonable time interval at least two or three times so as to generate read errors. Also, it is possible to use as the measure for judgment the case where signals are generated from the read head in a time interval shorter by at least 30% than the reference time interval T and the case where signals are not generated even after the lapse of time longer by at least 30% than the reference time interval T. In this case, it is possible to use as the measure for judgment the case where such a phenomenon has taken place once or the case where the signals are disturbed a plurality of times during the time 2T or 3T.

It is also possible to set arbitrarily the criteria for judgment that the read head has started again to travel over the regularly arrayed region. For example, it is judged that the read head is traveling over the regularly arrayed region in the case where signal have been generated at an interval within ±30% of the time interval T from the moment when a certain signal has been obtained. In this case, it is possible to use as the measure for the judgment the case where the particular phenomenon has taken place once or the case where signals have been obtained at a time interval T during the time 2T or 3T.

Where information is written, a defective region should be recognized before writing, and the writing is started again from the subsequent regular array region while avoiding the defective region. It follows that it is necessary for the read head to recognize the position of recording cells before the write head writes information in the recording cells. For allowing the read head to recognize the position of the recording cells, it is possible to arrange the read head forward of the write head in the track direction. Also, when it comes to an integrated head for reading and writing, it is possible to operate the head such that the head accesses the recording medium a plurality of times at the same track position so as to read the position of the recording cells, followed by writing information.

In the recording apparatus described above, it is possible for the write head to be shaped substantially similar to the recording cell. If the shape of the write head is made similar to the shape of the recording cell, it is possible to prevent cross-write among the recording cells and to improve writing efficiency. Since it is desirable for the recording cell to be circular, it is also desirable for the write head to be circular and to have a size equal to that of the recording cell. However, it is also possible for the write head to be shaped square having rounded corners or not having rounded corners as long as it is sized small enough to be contained in the circle of the recording cell.

It is possible for the recording apparatus according to another embodiment of the present invention to include a read head for tracking separately from the read head for reading information. The read head for tracking is used for the tracking of the read head for reading information and the write head by using the detection signals from regions other than the data region being read out as a tracking signal so as to achieving tracking more precisely and at a high speed.

In the case of a magnetic recording apparatus, the read head is formed of a magnetic sensor such as GMR, and the write head is formed of a magnetic head. In the case of a phase change optical recording apparatus, the read head is formed of an optical sensor for detecting difference in reflectance, and the write head is formed of a heat source head such as an optical head or an electron beam head.

In the case of an optically (or thermally)-assisted magnetic recording apparatus, a source for irradiating an electron beam or a near-field light as an auxiliary of the write magnetic head is used. The electron beam or the near-field light, which permits the irradiation spot to be made particularly small, is particularly useful for high-density recording.

In the case of an apparatus for a charge-storing medium, a charge sensor such as a field effect transistor (FET) may be used as a read head. For a charge-storing medium of particularly high recording density, use of a single electron transistor (SET) permits highly sensitive detection of charges. As a write head, an electron emission source made of, for example, a metal or a semiconductor. In writing operation, an electric field is applied between the write head and the underlying electrode formed under the recording layer (domain) of the charge-storing medium, thereby injecting charges to the recording domain. In erasing operation, a reverse electric field is applied to inject charges having reverse polarity to those used in the writing operation, or charges stored in the recording domain are withdrawn, thereby erasing recording.

EXAMPLES

The present invention will now be described in more detail with reference to Examples of the present invention. Needless to say, the present invention is not limited to the following Examples.

Example 1

In this Example, a recording track band is formed by regularly arraying a block copolymer in a groove region formed on a substrate. A method of manufacturing a magnetic recording medium for this Example will now be described with reference to FIGS. 2A to 2D.

Figure 2A:
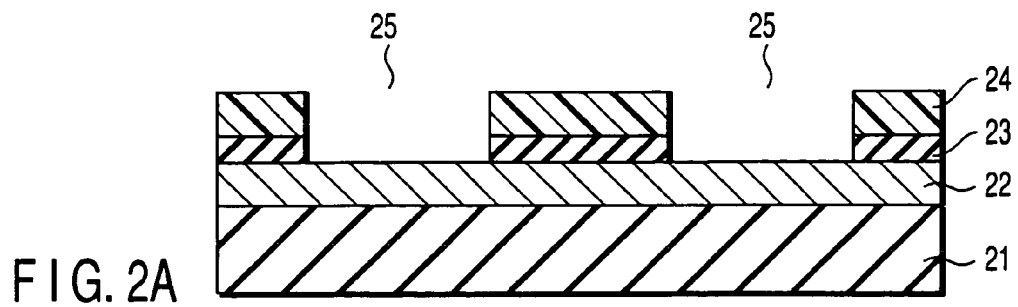
FIGS. 2A to 2D are cross-sectional views showing a method of manufacturing a magnetic recording medium for Example 1 of the present invention.

As shown in FIG. 2A, a groove structure is formed on a substrate as follows. Specifically, a magnetic layer 22 is formed by forming a Pd underlayer having a thickness of about 30 nm and a layer of a perpendicular magnetic recording material of Co—Cr—Pt having a thickness of about 50 nm on a glass disk substrate 21 having a diameter of 2.5 inches, followed by forming a $SiO_2$ film 23 having a thickness of about 50 nm on the magnetic layer 22. Then, a resist film 24 is formed on the $SiO_2$ film 23 by spin coating. Further, the resist film 24 is processed by optical lithography so as to form a resist pattern that is shaped such that a spiral groove 25 having a width of about 200 nm is defined by a convex portion having a width of about 200 nm. The $SiO_2$ film 23 is etched to reach the magnetic layer 22 by RIE with the resist pattern used as a mask so as to transfer the groove 25 to the $SiO_2$ film 23. The groove region thus formed provides a recording track band. Also, the magnetic layer 22 below the resist pattern is used as the isolation region.

Figure 2B:
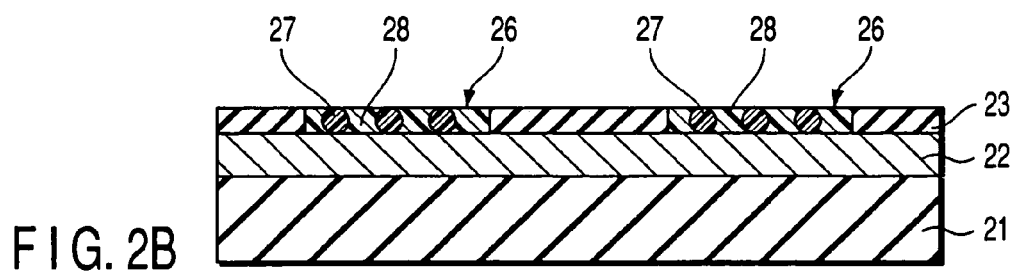

As shown in FIG. 2B, the groove region is filled with a block copolymer so as to form a regularly arrayed structure of fine particles as follows. Specifically, hydrophobic treatment is applied to the surface of the magnetic layer 22 with hexamethyldisilazane, followed by ashing the residue of the resist pattern. On the other hand, prepared is a solution of 1% w/w by dissolving polystyrene (PS)-polybutadiene (PB) block copolymer in toluene, PS having a molecular weight Mw of 10,000 and PB having a molecular weight Mw of 40,000. The substrate is coated with the solution thus prepared by spin coating so as to bury the block copolymer 26 in the groove region transferred to the $SiO_2$ film 23. The substrate is annealed at 150° C. for 30 hours under vacuum so as to regularly array the block copolymer 26. As a result, formed is a structure in which island-like polystyrene particles 27 are surrounded by a sea-like polybutadiene portion 28.

Figure 2C:
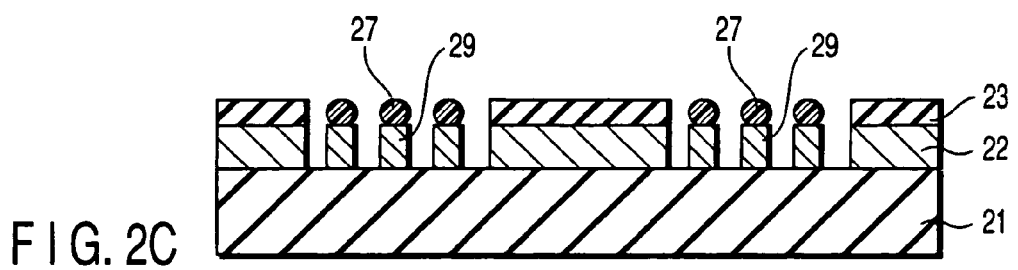

As shown in FIG. 2C, recording cells are formed with using the regularly arrayed fine particles as a mask. After the block copolymer 26 is treated with ozone so as to remove the polybutadiene portion 28, followed by washing with water. Further, recording cells 29 are formed by etching the magnetic layer 22 by Ar ion milling with using the residual polystyrene particles 27 as a mask.

Figure 2D:
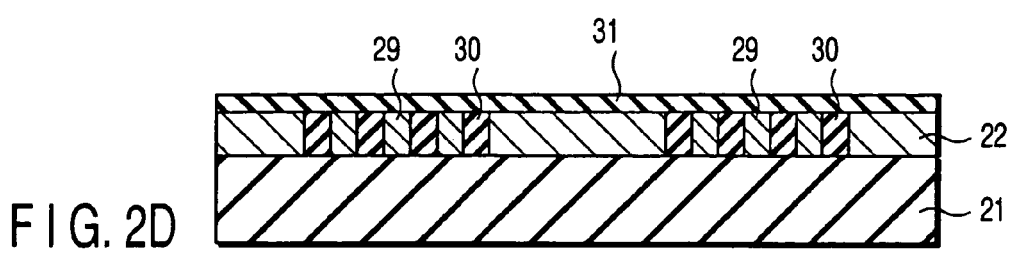

Finally, as shown in FIG. 2D, a matrix is formed in the space between the recording cells, followed by planarizing the surface of the matrix as follows. Specifically, the residue of the polystyrene particles are subjected to ashing, followed by forming a $SiO_2$ film having a thickness of about 50 nm on the entire surface so as to fill the space between the recording cells 29, thereby forming a matrix 30. The surface of the $SiO_2$ film is subjected to chemical mechanical polishing (CMP) so as to planarize the surface. Then, a diamond-like carbon film is formed on the entire surface so as to form the protective film 31.

Figure 3:
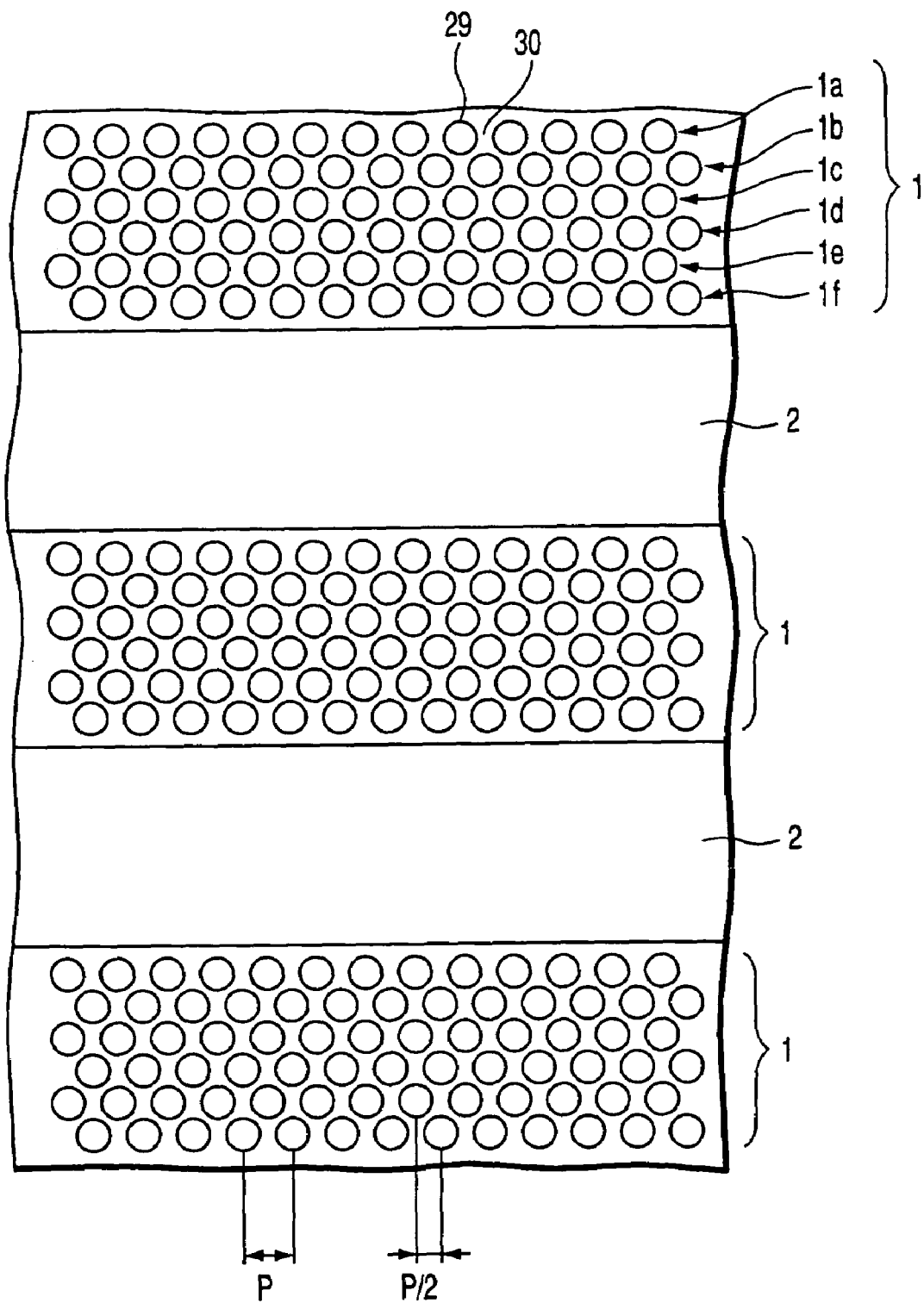
FIG. 3 is a plan view showing the magnetic recording medium for Example 1 of the present invention.

FIG. 3 schematically shows the result of observation of the magnetic recording medium thus manufactured with a magnetic force microscope. As shown in FIG. 3, recording track bands 1 each having a width of about 200 nm and isolation regions 2 each formed of a magnetic layer having a width of about 200 nm are formed alternately. The recording cells 29 are separated from each other by the matrix 30 within a single recording track band 1 so as to form a hexagonal close-packed structure and, thus, to form a triangular lattice. The recording cells 29 each having a size of 30 nm are periodically arrayed with a pitch P in the track direction so as to form a sub-track, and six rows of the sub-tracks 1a to 1f are included in each recording track band. Since the recording cells 29 form a triangular lattice as described above, nearest neighboring two recording cells 29 positioned on adjacent two sub-tracks are deviated in the track direction such that the distance in the track direction between the center of the recording cell 29 in one sub-track and the center of the adjacent recording cell 29 in the adjacent sub-track is equal to ½ of the pitch P of the recording cells forming the sub-track.

Example 2

In this Example, a recording track band is formed by regularly arraying a block copolymer in a band region containing a specified chemical substance formed on a substrate.

In the first step, a magnetic layer is formed on a substrate as in Example 1, followed by forming a $SiO_2$ film having a thickness of about 10 nm on the magnetic layer and subsequently forming a resist film on the $SiO_2$ film. As in Example 1, the resist film is processed by optical lithography so as to form a resist pattern such that a spiral groove having a width of about 200 nm is defined by a convex portion having a width of about 200 nm. After the surface of the exposed $SiO_2$ film is subjected to hydrophobic treatment with octadecyltrimethoxysilane, followed by removing the resist pattern. As a result, formed on the surface of the $SiO_2$ film are a hydrophilic band region (isolation region) which is not subjected to the hydrophobic treatment and a hydrophobic band region (recording track band) modified by alkyl chains subjected to the hydrophobic treatment. As in Example 1, a solution of a polystyrene-polybutadiene block copolymer is spin coated so as to permit the block copolymer to be selectively adsorbed on the hydrophobic band region. The block copolymer is annealed so as to form a regular array. As a result, formed is a structure in which island-like polystyrene particles are surrounded by a sea-like polybutadiene portion.

The block copolymer is treated with ozone so as to remove the polybutadiene portion, followed by washing with water. The $SiO_2$ film is etched by reactive ion etching with using the residual polystyrene particles as a mask so as to transfer the pattern of the polystyrene particles. Further, recording cells are formed by etching the magnetic layer by Ar ion milling with using the pattern of the residual $SiO_2$ film as a mask.

As in Example 1, a $SiO_2$ film as the matrix is formed on the entire surface so as to fill the space between the recording cells, followed by polishing the surface of the $SiO_2$ film by chemical mechanical polishing (CMP) so as to planarize the surface. Then, a diamond-like carbon film is formed on the entire surface so as to form a protective film.

The magnetic recording medium thus manufactured is observed with a magnetic force microscope. Recording track bands each having a width of about 200 nm and isolation regions each formed of the $SiO_2$ film having a width of about 200 nm are formed alternately. The recording cells are found to form a hexagonal close-packed structure and, thus, to form a triangular lattice in a single recording track band. The recording cells each having a size of 30 nm are periodically arrayed with a pitch P in the track direction so as to form a sub-track, and six rows of the sub-tracks are included in each recording track band. The nearest neighboring two recording cells positioned on two adjacent sub-tracks are deviated such that the distance in the track direction between the center of the recording cell in one sub-track and the center of the adjacent recording cell in the adjacent sub-track is equal to ½ of the pitch P of the recording cells forming the sub-track.

Example 3

A glass substrate is spin coated with a resist film containing a novolak resin as a base resin. The resist film is processed by optical lithography and development with a TMAH aqueous solution, followed by baking the resist film at 150° C. to cure the resin so as to form a resist pattern such that a spiral groove having a width of about 200 nm is defined by a convex portion having a width of about 200 nm and a height of about 40 nm.

Prepared is a solution by dissolving 2 parts by weight of polystyrene (PS)-polymethyl methacrylate (PMMA) block copolymer (PS having a molecular weight Mw of 65,000, PMMA having a molecular weight Mw of 13,500, and Mw/Mn being 1.0) in ethyl cellosolve acetate. The substrate is spin coated with the solution thus prepared so as to fill the groove regions between the resist patterns with the block copolymer. Then, the substrate is annealed so as to regularly array the block copolymer. As a result, formed is a structure in which island-like PMMA particles are surrounded by a sea-like PS portion. Reactive ion etching is performed to the resultant substrate for 25 seconds by using a $CF_4$ gas under the conditions of the output of 100 W, the flow rate of 30 sccm, and the pressure of 0.1 Torr. Under these conditions, PMMA is selectively etched, and the exposed glass substrate is etched with the residual PS pattern used as a mask. Ashing is performed to the substrate by using an $O_2$ gas under the conditions of the output of 100 W, the flow rate of 30 sccm, and the pressure of 0.1 Torr so as to remove the PS mask. As a result, formed is a pattern in which pores each having a size of 17 nm are arrayed in a close-packed structure within the band region having a width of about 200 nm formed on the glass substrate.

Based on the preliminary experiment described above, PMMA is selectively etched by RIE using a $CF_4$ gas, followed by etching the exposed glass substrate with the residual PS pattern used as a mask and subsequently forming a Co—Cr—Pt film by sputtering. Then, ashing is performed with using an $O_2$ gas so as to remove the PS mask.

The magnetic recording medium thus manufactured is observed with a magnetic force microscope. It has been found that a pattern in which pores each having a size of 17 nm are arrayed in a manner to form the close-packed structure within the band region having a width of about 200 nm formed on the glass substrate.

Example 4

In this Example, a recording track band is formed by regularly arraying metal fine particles in a groove region formed on a substrate.

In the first step, a magnetic layer, a $SiO_2$ film having a thickness of about 20 nm and an electron beam resist are successively formed in the order mentioned on a glass substrate. The resist film is processed by electron beam lithography so as to form a resist pattern in which a spiral groove having a width of about 100 nm is defined by a convex portion having a width of about 150 nm. The substrate is dipped in an aqueous gold colloid solution containing fine gold particles having a size of 40 nm, followed by rinsing the substrate with pure water. As a result, the fine gold particles are regularly arrayed within the groove formed between the resist patterns. Then, the $SiO_2$ film is etched to the magnetic layer by RIE, followed by further etching the magnetic layer by Ar ion milling. After removal of the $SiO_2$ film, the substrate is observed with an electron microscope. As a result, recording cells each having a size of 40 nm are found to have formed a close-packed structure within the recording track band having a width of about 100 nm so as to form two rows of sub-tracks.

Example 5

In this Example, a recording track band is formed by regularly arraying a block copolymer in a groove region formed on a substrate so as to form a matrix having pores, followed by filling the pores with a magnetic recording material. A method of manufacturing a magnetic recording medium for this Example will now be described with reference to FIGS. 4A to 4D.

Figure 4A:
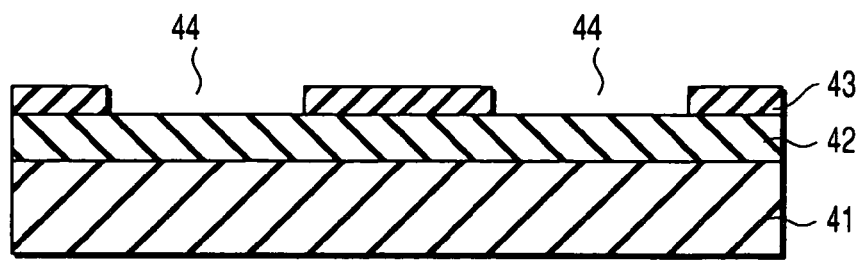
FIGS. 4A to 4D are cross-sectional views showing a method of manufacturing a magnetic recording medium for Example 5 of the present invention.

As shown in FIG. 4A, a groove structure is formed on a substrate as follows. Specifically, successively formed on a glass disk substrate 41 having a diameter of 2.5 inches are a Pd underlayer having a thickness of about 30 nm, an $Al_2O_3$ film 42 having a thickness of about 50 nm, which forms a matrix and a isolation region, and a $SiO_2$ film 43 having a thickness of about 50 nm in the order mentioned. After a resist film is formed on the $SiO_2$ film 43 by spin coating, the resist film is processed by optical lithography so as to form a resist pattern in which a spiral groove having a width of about 200 nm is defined by a convex portion having a width of about 200 nm. Then, the $SiO_2$ film 43 is etched with the resist pattern used as a mask so as to transfer the groove 44.

Figure 4B:
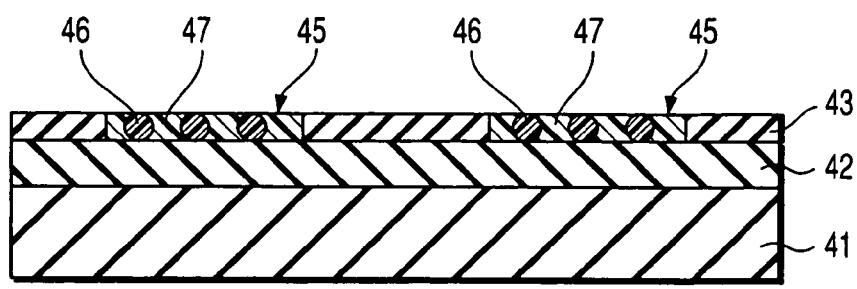

As shown in FIG. 4B, the groove region is filled with a block copolymer to form a regular array of fine particles as follows. Specifically, prepared is a solution by dissolving polystyrene-polymethyl methacrylate block copolymer (PS having a molecular weight Mw of 80,000 and PMMA having a molecular weight Mw of 20,000) in a concentration of 1% w/w in toluene. The substrate is spin coated with the solution thus prepared so as to fill the groove region transferred to the $SiO_2$ film 43 with the block copolymer 45. The substrate is annealed at 150° C. for 30 hours under vacuum so as to regularly array the block copolymer 45. As a result, formed is a structure in which island-like polymethyl methacrylate particles 46 are surrounded by a sea-like polystyrene portion 47.

Figure 4C:
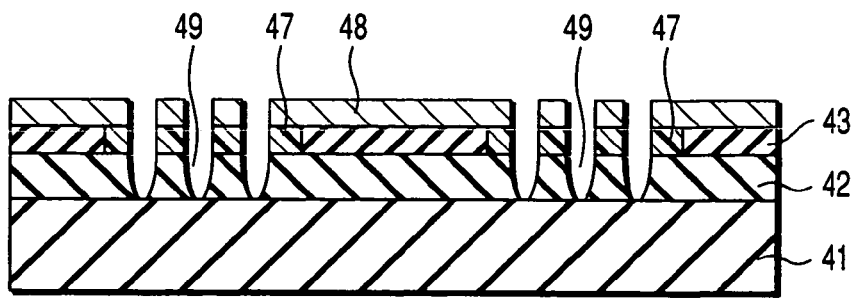

As shown in FIG. 4C, a pore structure for the recording cells is formed as follows. Specifically, the block copolymer 45 is treated with an ultraviolet ray so as to decompose the polymethyl methacrylate chain, followed by washing with water. Then, a Cr layer 48 is formed by an oblique vapor deposition. The $SiO_2$ film 43 is selectively etched by RIE with the Cr layer used as a mask so as to form pores extending to reach the $Al_2O_3$ film 42, followed by transferring the pores 49 to the $Al_2O_3$ film 42 by Ar ion milling so as to form a matrix consisting of the $Al_2O_3$ film 42.

Figure 4D:
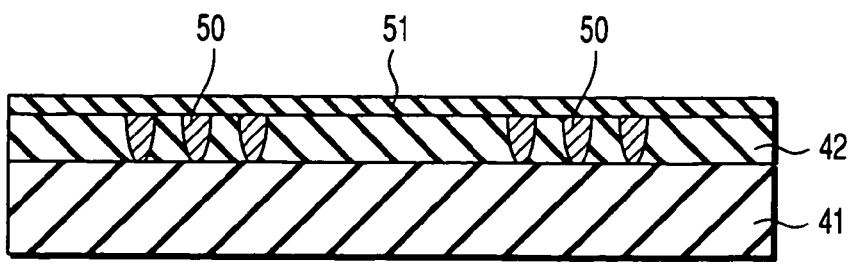

Further, as shown in FIG. 4D, recording cells are formed as follows, followed by planarizing the surface. Specifically, a film of a perpendicular magnetic recording material Co—Cr—Pt is formed in a thickness of about 50 nm so as to fill the pores 49, thereby forming recording cells 50, followed by polishing the surface by CMP so as to planarize the surface. Then, a film of a diamond-like carbon is formed on the entire surface so as to form the protective film 51.

Figure 5:
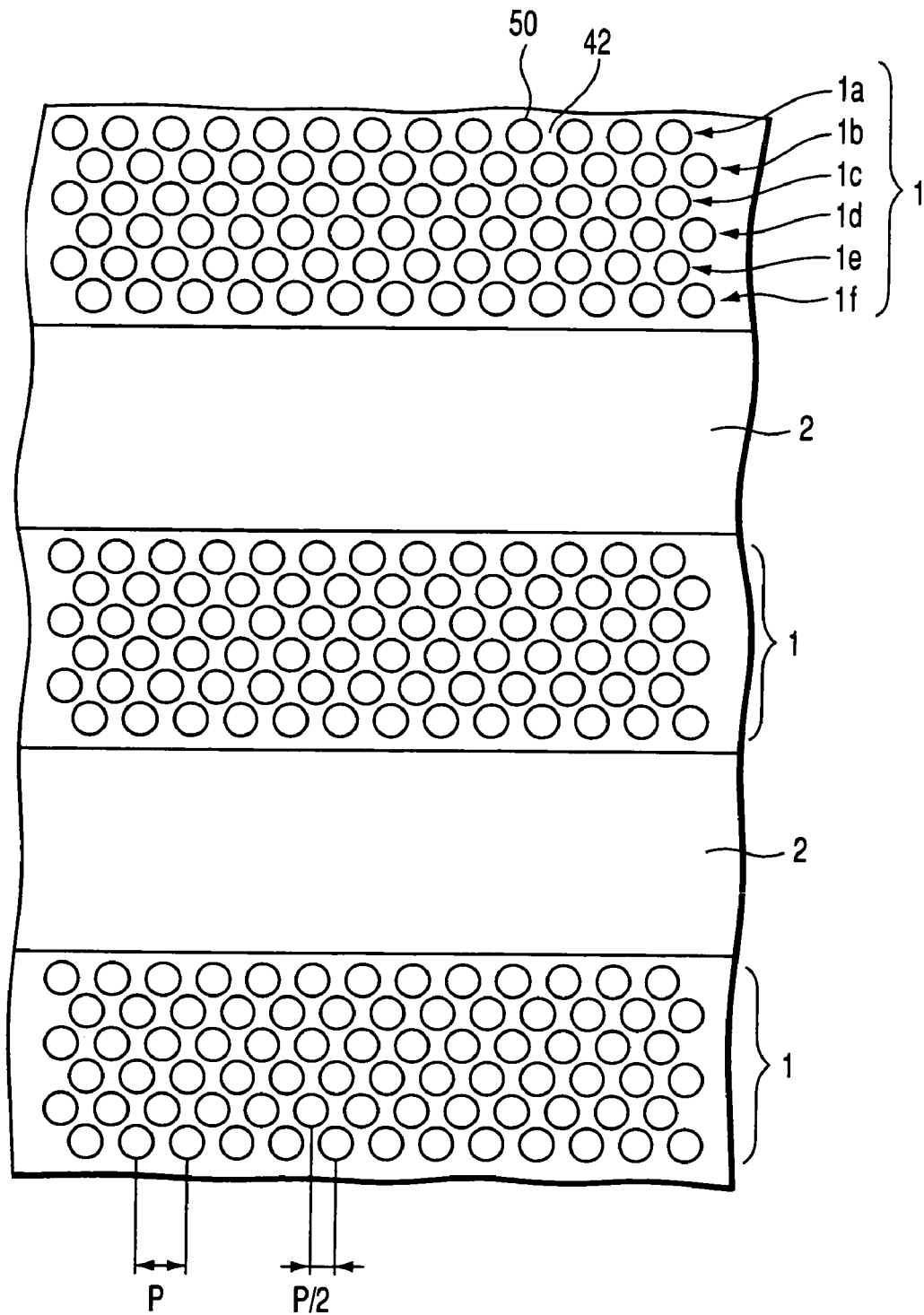
FIG. 5 is a plan view showing the magnetic recording medium for Example 5 of the present invention.

FIG. 5 schematically shows the result of observation of the magnetic recording medium thus manufactured with a magnetic force microscope. As shown in FIG. 5, recording track bands 1 each having a width of about 200 nm and isolation regions 2 each formed of the $Al_2O_3$ film 42 having a width of about 200 nm are formed alternately. The recording cells 50 form a hexagonal close-packed structure and, thus, to form a triangular lattice within a single recording track band 1. The recording cells 50 each having a size of 30 nm are periodically arrayed with a pitch P in the track direction so as to form a sub-track, and six rows of the sub-tracks 1a to 1f are included in each recording track band 1. The nearest neighboring two recording cells 50 positioned on adjacent two sub-tracks are deviated such that the distance in the track direction between the center of the recording cell 50 in one sub-track and the center of the adjacent recording cell 50 in the adjacent sub-track is equal to ½ of the pitch P of the recording cells forming the sub-track.

Example 6

In this Example, intermittent recording track bands are formed with employing the method similar to that employed in Example 5 and by separating the recording track band in a predetermined length in the track direction.

Specifically, as in Example 5, an $Al_2O_3$ film having a thickness of about 50 nm and a $SiO_2$ film having a thickness of about 40 nm are formed successively on a glass disk substrate. After a resist film is formed on the $SiO_2$ film by spin coating, the resist film is processed by optical lithography so as to form a resist pattern in which a spiral groove having a width of about 140 nm is defined by a convex portion having a width of about 200 nm and the inner region of the groove is separated by a convex portion having a width of about 100 nm so as to form groove regions each having a length of 100 µm. Then, the $SiO_2$ film is etched with the resist pattern used as a mask so as to transfer the groove.

As in Example 5, the groove region of the $SiO_2$ film is filled with a PS-PMMA block copolymer, followed by annealing so as to regularly array the block copolymer. Then, pores extending to reach the $Al_2O_3$ film are formed by RIE, followed by transferring the pores to the $Al_2O_3$ film by Ar ion milling so as to provide a matrix formed of the $Al_2O_3$ film.

As a result of observation with an electron microscope, it has been found that the pores are completely arrayed to form four rows of sub-tracks within the intermittent recording track bands each having a length of 100 µm and a width of about 140 nm. It has also been found that completely arrayed pores are formed on the entire surface of the disk. Then, formation of a film of a magnetic recording material, planarizing of the formed film and formation of a protective film are performed so as to manufacture a magnetic recording medium.

Example 7

In this Example, a recording track band is formed by regularly arraying a block copolymer in a groove region formed on a substrate, followed by forming a matrix having pores by utilizing anodic oxidation of Al and subsequently filling the pores of the matrix with a magnetic recording material.

To be more specific, an Al film having a thickness of about 50 nm and a $SiO_2$ film having a thickness of about 50 nm are formed successively one upon the other on a glass disk substrate. After a resist film is formed on the $SiO_2$ film by spin coating, the resist film is processed by optical lithography so as to form a resist pattern in which a spiral groove having a width of about 200 nm is defined by a convex portion having a width of about 300 nm. Then, the $SiO_2$ film is etched with the resist pattern thus formed used as the mask.

The groove region of the $SiO_2$ film is filled with a PS-PMMA block copolymer (PS having a molecular weight Mw of 120,000 and PMMA having a molecular weight Mw of 30,000), followed by annealing so as to regularly array the block copolymer. Then, Ar ion milling is applied directly so as to form pores in the block copolymer, followed by slightly etching the surface of the Al film so as to form recesses providing initiating points for anodic oxidation. Further, the residual block copolymer is removed by using acetone, followed by performing anodic oxidation in a sulfuric acid bath under a voltage of 25 V so as to form a matrix consisting of $Al_2O_3$.

As a result of observation with an electron microscope, it has been found that the pores each having a size of 30 nm are arrayed to form four rows of sub-tracks within the recording track band each having a width of about 200 nm. Then, formation of a film of a magnetic recording material, planarizing of the formed film and formation of a protective film are performed so as to manufacture a magnetic recording medium.

Example 8

In this Example, a master disk is prepared, and a recording medium is manufactured by employing a nano-imprinting technology. A method of manufacturing a master disk will now be described with reference to FIG. 6A to 6C. Also, a method of manufacturing a magnetic recording medium according to this Example will now be described with reference to FIGS. 7A to 7D.

Figure 6A:
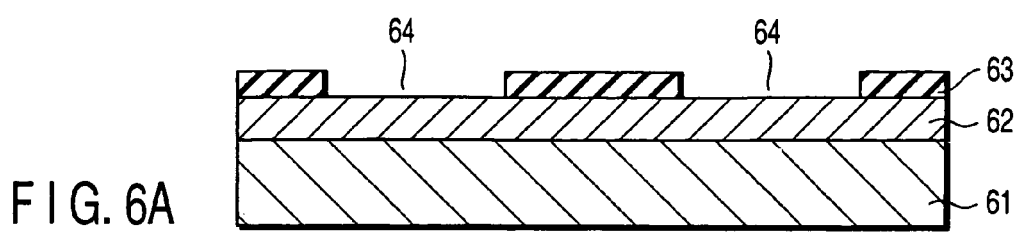
FIGS. 6A to 6C are cross-sectional views showing a method of manufacturing a master disk used for the manufacture of a magnetic recording medium for Example 8 of the present invention.

As shown in FIG. 6A, a groove structure is formed on a substrate as follows. In the first step, a Ti film 62 having a thickness of about 50 nm and a $SiO_2$ film 63 having a thickness of about 50 nm are successively formed on a silicon disk substrate 61. The $SiO_2$ film 63 is patterned so as to define a spiral groove 64 having a width of about 200 nm by a convex portion having a width of about 200 nm.

Figure 6B:
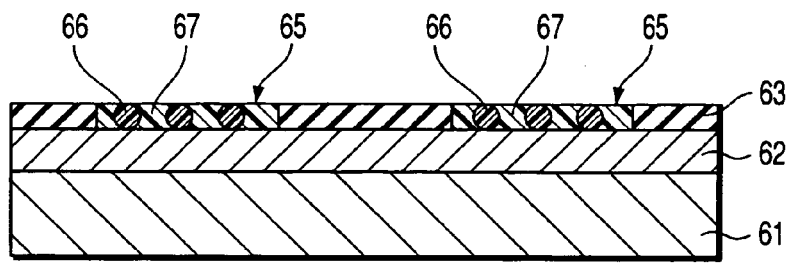

As shown in FIG. 6B, a regular array structure of fine particles is formed within the groove region as follows. Specifically, the groove region of the $SiO_2$ film 63 is filled with a PS-PB block copolymer (PS having a molecular weight Mw of 30,000 and PB having a molecular weight Mw of 120,000). The substrate is annealed so as to regularly array the block copolymer 65. As a result, formed is a structure in which island-like polystyrene particles 66 are surrounded by a sea-like polybutadiene portion 67.

Figure 6C:
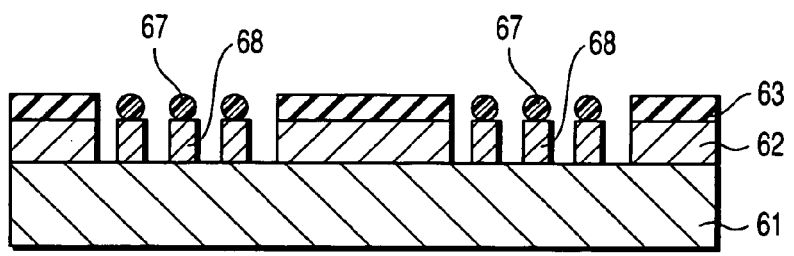

As shown in FIG. 6C, Ti pillars corresponding to recording cells are formed as follows with the regularly arrayed fine particles used as a mask. Specifically, the block copolymer 65 is treated with ozone so as to remove the polybutadiene portion 67, followed by washing with water. Then, the Ti layer 62 is etched by Ar ion milling with the residual polystyrene particles 66 used as a mask. Further, the $SiO_2$ 63 is removed by treatment with a hydrofluoric acid. The master disk thus prepared is observed with an electron microscope, finding that Ti pillars 68 each having a size of 30 nm are regularly arrayed to form six rows within the groove region.

Figure 7A:
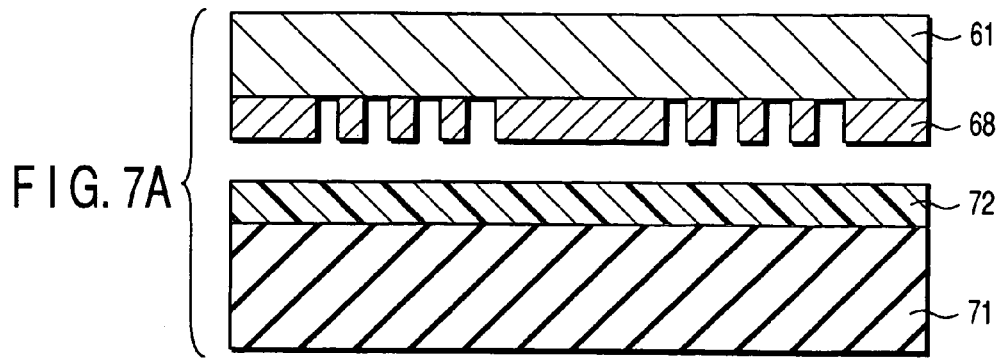
FIGS. 7A to 7D are cross-sectional views showing a method of manufacturing the magnetic recording medium for Example 8 of the present invention.
Figure 7B:
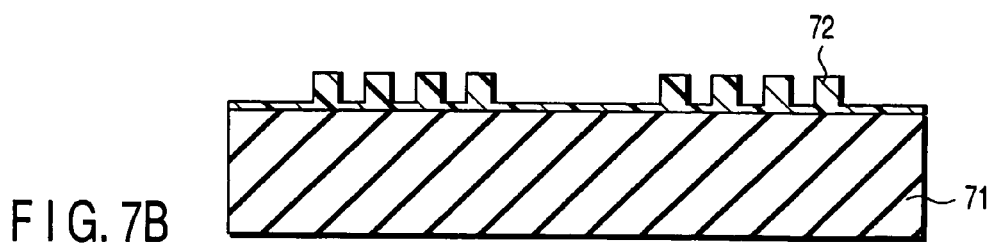
Figure 7C:
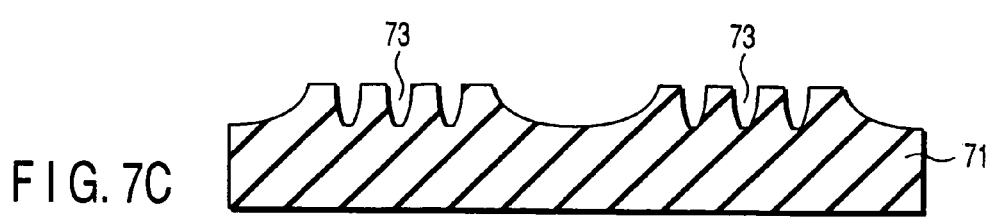
Figure 7D:
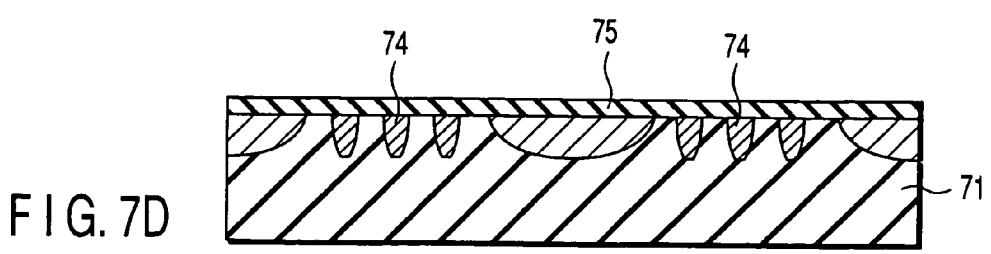

As shown in FIG. 7A, a glass disk substrate 71 is spin coated with a resist film 72. Then, a master disk 61 is pressed to the glass disk substrate 71 while heating the disk at 200° C. The substrate is observed with an atomic force microscope, with the result that pores each having a size of 30 nm are regularly arrayed in the resist film 72 to form six rows, as shown in FIG. 7B. As shown in FIG. 7C, the glass disk substrate 71 is etched by means of Ar ion milling to form pores 73. Finally, the pores 73 is filled with a film of a perpendicular magnetic recording material of Co—Cr—Pt followed by planarizing the surface by means of CMP, thereby forming recording cells 74, and subsequently forming a film of a diamond-like carbon on the entire surface so as to form a protective film 75, as shown in FIG. 7D.

The substrate thus prepared is observed with a magnetic force microscope so as to confirm that the recording cells 74 each having a size of 30 nm are regularly arrayed within a single recording track band so as to form six rows of the sub-tracks.

Example 9

In this Example, recording cells are formed by regularly arraying directly fine particles of a magnetic material. A method of manufacturing a magnetic recording medium for this Example will now be described with reference to FIGS. 8A to 8C.

Specifically, a colloid of fine Co—Pt particles having a size of 10 nm is prepared by a known method described in S. Sun et al., Science, 287 (2000) pp. 1989.

Figure 8A:
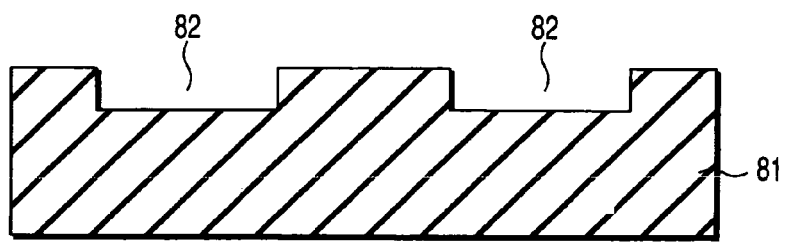
FIGS. 8A to 8C are cross-sectional views showing a method of manufacturing a magnetic recording medium for Example 9 of the present invention.

As shown in FIG. 8A, a glass disk substrate 81 is processed by electron beam lithography so as to have a spiral groove 82 having a width of about 110 nm defined by a convex portion having a width of about 150 nm and a height of about 10 nm.

Figure 8B:
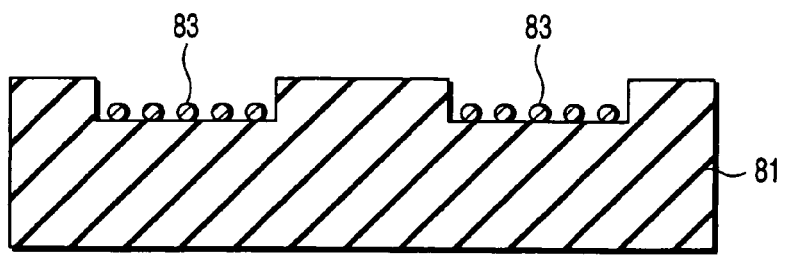

Then, as shown in FIG. 8B, the colloid of the fine Co—Pt particles is applied uniformly to the entire surface of the glass disk substrate 81, followed by removing the solvent by evaporation and subsequently rinsing the substrate with a pure water, thereby forming recording cells 83 made of Co—Pt fine particles.

Figure 8C:
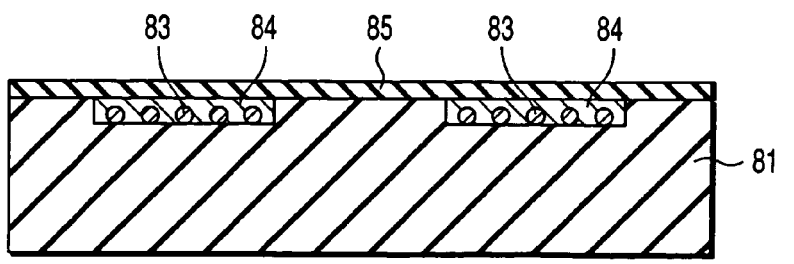

Further, as shown in FIG. 8C, the matrix 84 is formed by sputtering a $SiO_2$ film on the entire surface, followed by planarizing the surface by means of CMP and subsequently forming a film of a diamond-like carbon so as to form the protective film 85.

The substrate thus prepared is observed with a magnetic force microscope. It has been confirmed that recording cells 83 having a size of 10 nm are regularly arrayed within a single recording track band so as to form a hexagonal close-packed structure and to form ten rows of the sub-tracks.

Example 10

A method of manufacturing a magnetic recording medium for this Example will now be described with reference to FIGS. 9A to 9D.

Figure 9A:
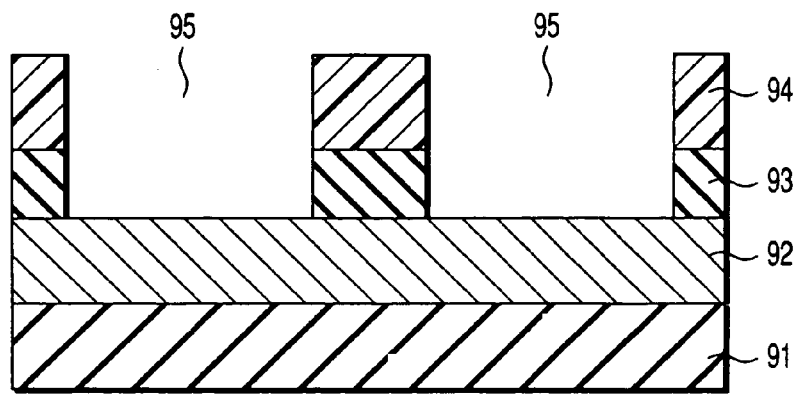
FIGS. 9A to 9D are cross-sectional views showing a method of manufacturing a magnetic recording medium for Example 10 of the present invention.

As shown in FIG. 9A, a groove structure is formed on a substrate as follows. Specifically, formed on a glass disk substrate 91 having a diameter of 2.5 inches are a Pd underlayer having a thickness of about 30 nm and a film of a perpendicular magnetic recording material Co—Cr—Pt having a thickness of about 50 nm so as to form a magnetic layer 92, followed by forming a $SiO_2$ film 93 having a thickness of about 50 nm on the magnetic layer 92. Then, the $SiO_2$ film 93 is spin coated with a resist film 94. The resist film 94 thus formed is processed by nano-imprinting lithography so as to form a resist pattern such that a spiral groove having a width of about 40 nm is defined by a convex portion having a width of about 20 nm. The $SiO_2$ film 93 is etched to reach the magnetic layer 92 by RIE with the resist pattern thus formed used as a mask so as to transfer the groove 95 to the $SiO_2$ film 93.

Figure 9B:
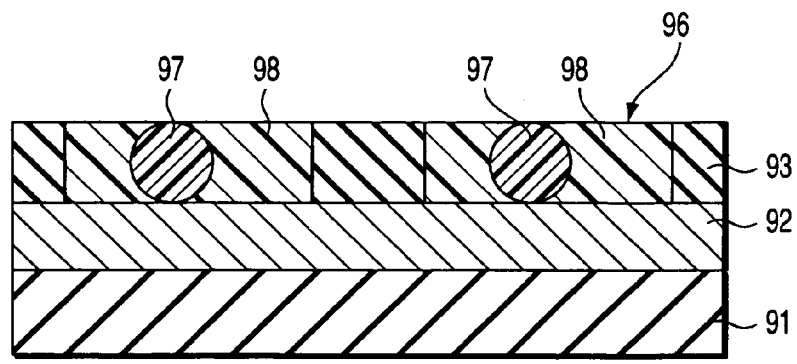
Figure 9C:
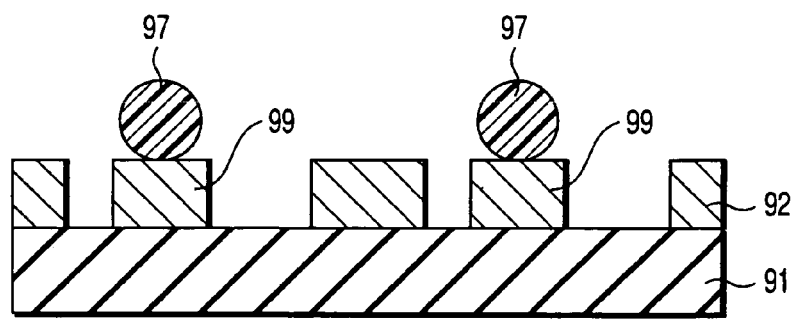

As shown in FIG. 9B, the groove region is filled with a block copolymer to form a regularly arrayed structure of fine particles as follows. Specifically, the surface of the magnetic layer 92 is subjected to hydrophobic treatment with hexamethyldisilazane, followed by ashing the residue of the resist pattern. On the other hand, prepared is a solution by dissolving a PS-PB block copolymer (PS having a molecular weight Mw of 5,000 and PB having a molecular weight Mw of 20,000) in toluene in a concentration of 1% w/w. The substrate is spin coated with the solution thus prepared so as to fill the groove region transferred to the $SiO_2$ film 93 with the block copolymer 96. The substrate is annealed at 50° C. for 30 hours under vacuum so as to regularly array the block copolymer 96. As a result, formed is a structure in which island-like polystyrene particles 97 are surrounded by a sea-like polybutadiene portion 98.

In the next step, recording cells are formed as follows with the regularly arrayed fine particles used as a mask. Specifically, the block copolymer 96 is treated with ozone so as to remove the polybutadiene portion 98, followed by washing with water. Then, the magnetic layer 92 is etched by Ar ion milling with the residual polystyrene particles 97 used as a mask so as to form recording cells 99.

Figure 9D:
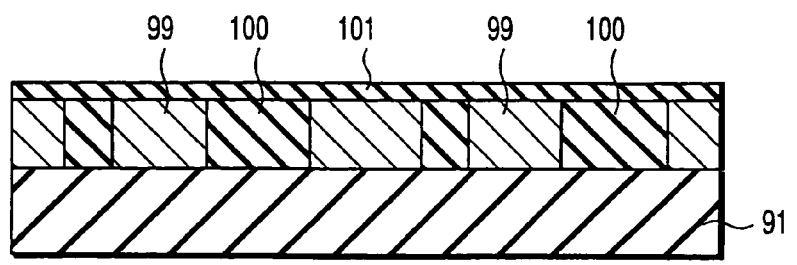

Further, a matrix is formed in the space between the recording cells as follows, followed by planarizing the surface, as shown in FIG. 9D. Specifically, the residue of the polystyrene particles is subjected to ashing, followed by forming a $SiO_2$ film having a thickness of about 50 nm on the entire surface so as to fill the space between the recording cells 99 with the $SiO_2$ film to form the matrix 100. The surface of the $SiO_2$ film is subjected to chemical mechanical polishing (CMP) so as to planarize the surface, followed by depositing a film of a diamond-like carbon so as to form a protective film 101.

Figure 10:
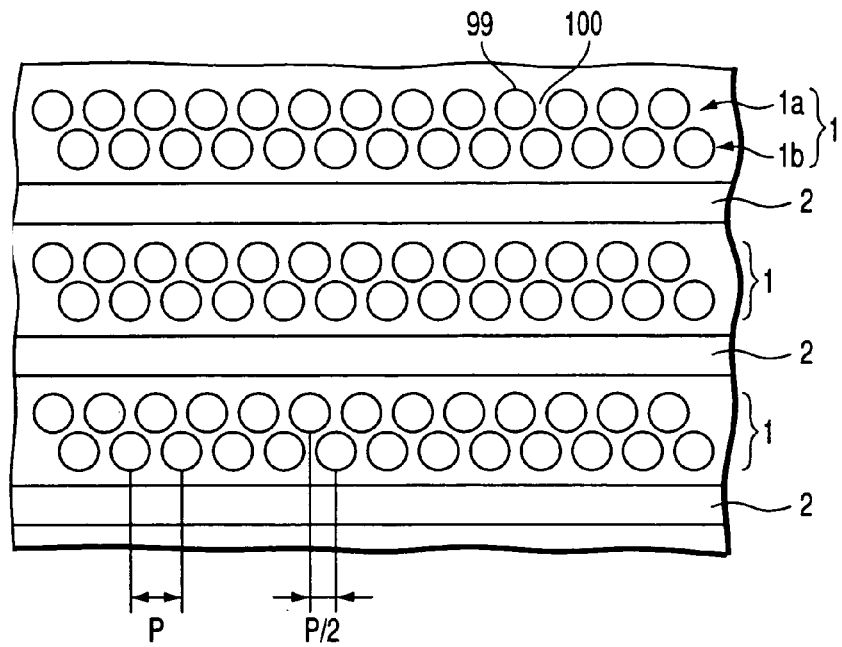
FIG. 10 is a plan view showing the magnetic recording medium for Example 10 of the present invention.

FIG. 10 schematically shows the result of observation of the magnetic recording medium thus manufactured with a magnetic force microscope. As shown in FIG. 10, recording track bands 1 each having a width of about 40 nm and isolation regions 2 each formed of a magnetic layer having a width of about 20 nm are formed alternately. The recording cells 99 are separated from each other by the matrix 100 within a single recording track band 1 so as to form a hexagonal close-packed structure and, thus, to form a triangular lattice. The recording cells 99 are periodically arrayed with a pitch P in the track direction so as to form a sub-track, and two rows of the sub-tracks 1a and 1b are included in a single recording track band 1. Since the recording cells 99 form a triangular lattice as described above, the nearest neighboring two recording cells 99 positioned on adjacent two sub-tracks are deviated such that the distance in the track direction between the center of the recording cell 99 in one sub-track and the center of the recording cell 99 in the adjacent sub-track is equal to ½ of the pitch P of the recording cells forming the sub-track.

Example 11

A magnetic recording apparatus according to this Example will now be described with reference to FIGS. 11 to 14.

Figure 11:
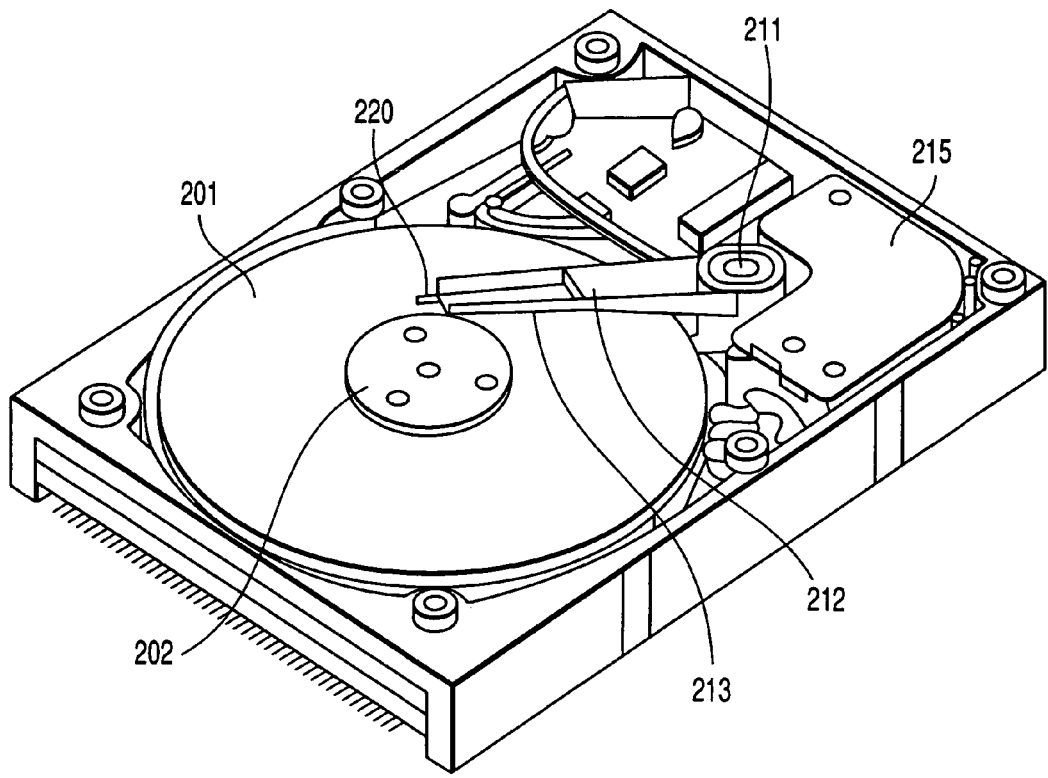
FIG. 11 is a perspective view showing the internal construction of a magnetic disk apparatus for Example 11 of the present invention.

FIG. 11 is a perspective view showing the internal structure of a magnetic disk apparatus. As shown in the drawing, a magnetic disk 201 is mounted on a spindle motor 202 so as to be rotated in accordance with control signals supplied from a control section (not shown). An actuator arm 212 is supported on a shaft 211, and a suspension 213 and a head slider 220 at the tip of the suspension 213 are supported with the actuator arm 212. When the magnetic disk 210 is rotated, that surface of the head slider 220 which faces the recording medium is kept floating by a predetermined amount from the surface of the magnetic disk 201 so as to perform recording-reproducing of information. A voice coil motor 215 is mounted on the proximal end of the actuator arm 212 so as to allow the actuator arm 212 to rotate.

Figure 12:
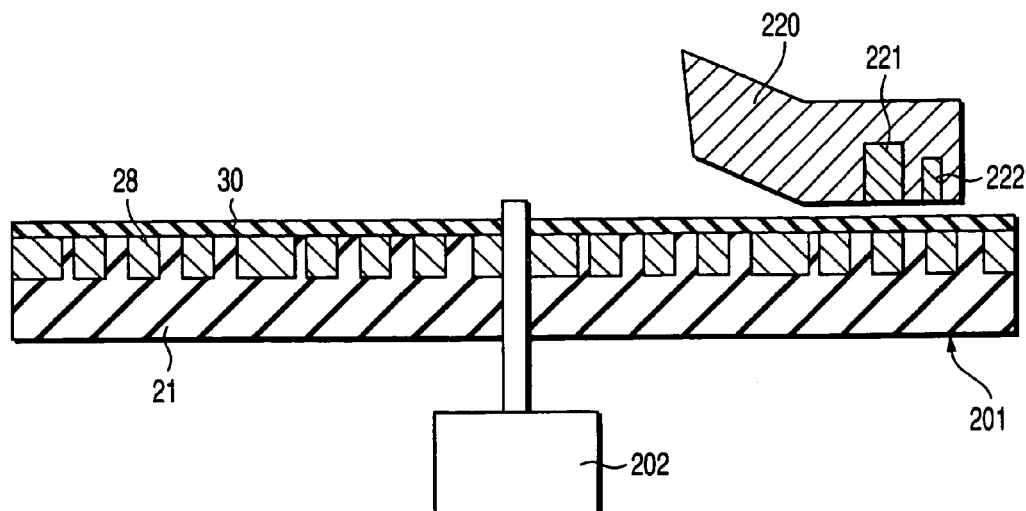
FIG. 12 is a cross-sectional view showing the magnetic disk and the head slider for Example 11 of the present invention.

FIG. 12 is a cross-sectional view showing the constructions of the magnetic disk 201 and the head slider 220. The magnetic disk 201 is equal to that prepared in Example 1. As shown in the drawing, a recording layer including a recording track band in which recording cells 28 are regularly arrayed and a protective layer 30 are formed on a glass substrate 21. Information corresponding to the address number and the sector number of each recording track band is written in advance in the magnetic layer forming the isolation region.

A read head 221 and a write head 222 are mounted on the tip of the head slider 220. A two-stage actuator (not shown) actuates the head slider 220 so as to control the positions thereof.

Figure 13:
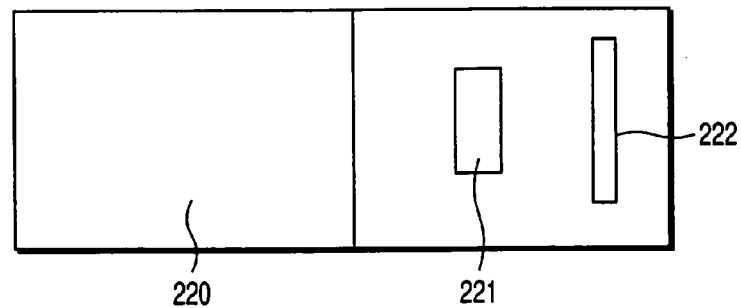
FIG. 13 schematically shows the planar construction of the head slider for Example 11 of the present invention.

FIG. 13 schematically shows the planar structure of the head slider 220. The GMR read head 221 is sized at about 40 nm×about 20 nm, and the single magnetic pole write head 222 is sized at about 60 nm×about 10 nm.

Figure 14:
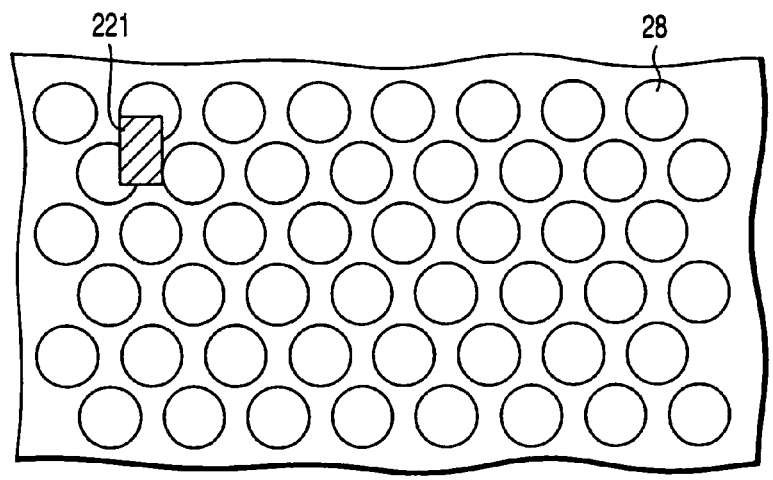
FIG. 14 shows the arrangement of the reading head relative to the recording track band for Example 11 of the present invention.

FIG. 14 shows the arrangement of the read head relative to the recording track band. As shown in FIG. 14, the recording cells 28 each having a size of 30 nm are regularly arrayed at a predetermined pitch in the track direction so as to form six rows of the sub-tracks in the recording track band 1. The single read head 221 reads the recording cells on the two rows of the sub-tracks. The size of the read head 221 is designed to meet the conditions given below. Specifically, the read head 221 has a width in the track direction of 20 nm, which is smaller than the distance between the centers of the adjacent recording cells 28, and also has a length of 40 nm in the radial direction of the disk, which is larger than the distance in the radial direction between the centers of the nearest neighboring two recording cells 28 on the adjacent two sub-tracks and is smaller than the maximum width of the two rows of the sub-tracks.

The tracking method in the magnetic recording apparatus in this Example will now be described with reference to FIGS. 15A to 15C. In this Example, the position of the head slider is controlled such that the signals generated from the two rows of the sub-tracks formed by the recording cells regularly arrayed to form a triangular lattice are allowed to have the same intensity.

Figure 15A:
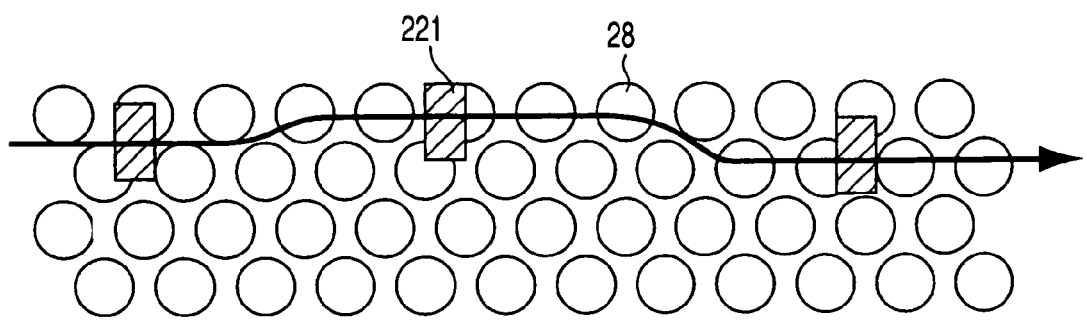
FIGS. 15A to 15C show the tracking method for Example 11 of the present invention.
Figure 15B:
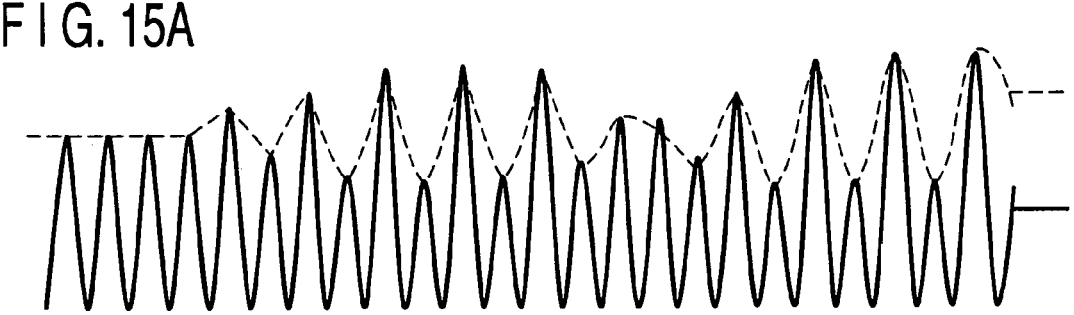
Figure 15C:
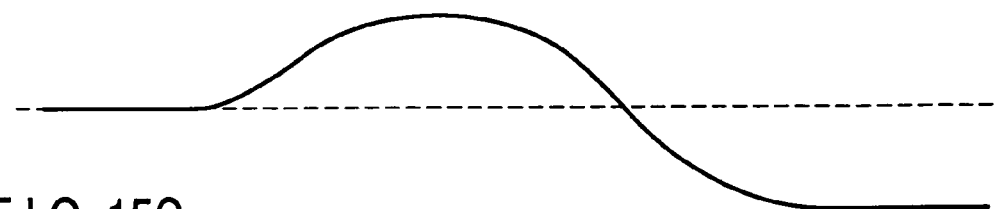

FIG. 15A shows change in the geometric positional relationship between the read head and the recording cells. A detection output as shown in FIG. 15B can be obtained in accordance with the movement of the read head shown in FIG. 15A. Where the read head 221 travels along the centerline of the two rows of sub-tracks, the frequency component f1 alone, which corresponds to twice the period of the recording cells on the sub-track, appears on the detection output (absolute value). However, if the position of the read head 221 is deviated from the centerline, the frequency component f2 corresponding to the period of the recording cells on the sub-track is increased in the detection output (absolute value). The phase of the frequency component f2 in the case where the read head 221 is deviated in the direction of the first line of the recording cells differs from that in the case where the read head 221 is deviated in the direction of the second line of the recording cells. Therefore, it is possible to obtain a signal conforming to the change in the traveling of the read head 221, as shown in FIG. 15C. It follows that, where the frequency component f2 has been detected, it is possible to perform tracking by moving the read head 221 in the radial direction in accordance with the phase thereof so as to prevent the frequency component f2 from being detected.

Figure 16:
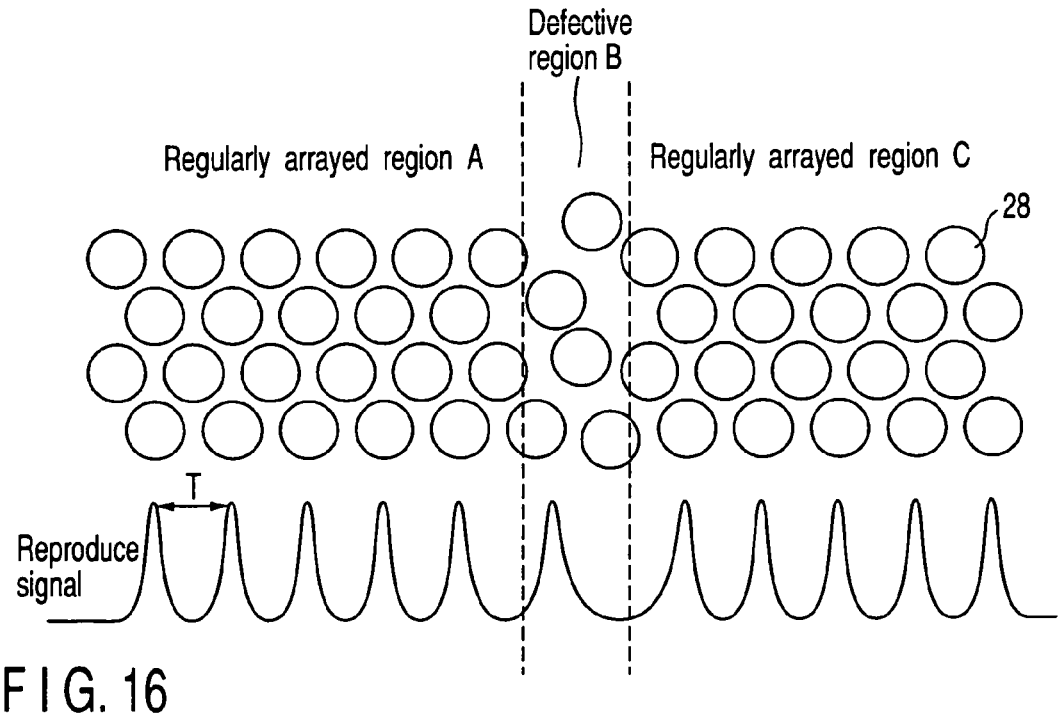
FIG. 16 shows how to avoid writing in a defective region in Example 11 of the present invention.

A method of avoiding writing in a defective region in the case where a defective region is included in the regular array will now be described with reference to FIG. 16.

In the magnetic recording medium manufactured by utilizing self-ordering, it is possible for a disturbed region of array to be included in the region where the recording cells are regularly arrayed. Suppose the recording track band includes regions A and C in which the recording cells are regularly arrayed and a defective region C, in which the recording cell array is disturbed. As shown in FIG. 16, the defective region C is interposed between the regions A and C.

In the magnetic recording medium for this Example, a read head is positioned forward of a write head, and writing is controlled as follows in accordance with the signals detected by the read head. The time interval T at which the signals detected by the read head are expected to appear is determined by the distance between the two adjacent recording cells that are regularly arrayed in the track direction and by the traveling speed of the head. The time interval T is compared with the time interval of the signals actually generated from the read head by a controller.

While the read head is traveling over the regularly arrayed region A, signals are regularly generated from the recording cells at a substantially constant time interval close to the time interval T. Incidentally, if the time interval at which signals are actually generated falls within the threshold value, e.g., ±30%, relative to the time interval T, it is reasonable to judge that the recording cells are regularly arrayed. In this case, signals are supplied from the controller to the write head at a predetermined timing on the basis of the time when the read head detects signals, and writing to the regularly arrayed region A is performed by the write head.

However, when the read head travels over the defective region B, the time interval of the signals read from the recording cells is deviated over the threshold value, e.g., ±30%, compared with the time interval T, and it is judged that the array of the recording cells is disturbed. In this case, write signals from the controller to the write head are stopped, with the result that writing to the defective region B is not performed.

Further, if the read head comes to travel over the regularly arrayed region C, it is judged that the recording cells are arrayed regularly. In this case, write signals are supplied from the controller to the write head at a predetermined timing on the basis of the time when signals are detected by the read head, and writing to the regularly arrayed region C by the write head is started again.

Incidentally, it is possible to set arbitrarily the criteria for the judgment as to whether the array of the recording cells is disturbed or regularly arrayed. For example, it is possible to construct a system such that it is judged that the array of the recording cells is disturbed in the case where the disturbance in the time interval of the signals detected by the read head is continuously generated for the time not shorter than 3T. It is also possible to construct the system such that it is judged that the recording cells are arrayed regularly in the case where the signals are detected three times consecutively by the read head at a time interval falling within the threshold value.

Figure 17:
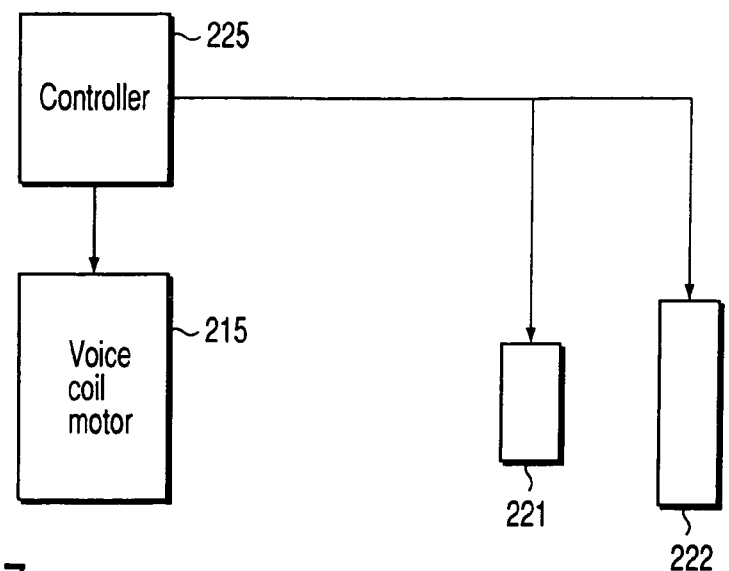
FIG. 17 is a block diagram showing a controller for controlling the read head, the write head, and the voice coil motor in Example 11 of the present invention.

The tracking of the read head described above with reference to FIG. 15 and the operation to avoid writing to the defective region described above with reference to FIG. 16 are carried out by the controller (LSI) 225 connected to the read head 221, the write head 222 and the voice coil motor as shown in FIG. 17.

Example 12

A magnetic recording apparatus for this Example will now be described with reference to FIGS. 18 to 20.

Figure 18:
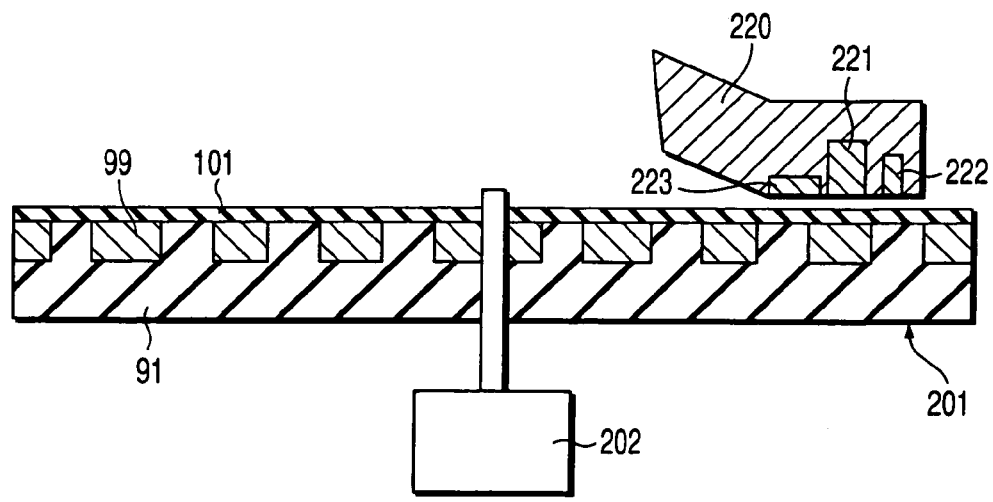
FIG. 18 is a cross-sectional view showing the magnetic disk and the head slider for Example 12 of the present invention.

Specifically, FIG. 18 is a cross-sectional view showing the constructions of the magnetic disk and the head slider. The magnetic disk 201 is mounted on a spindle motor 202 and is rotated according to control signals generated from a control section (not shown). The magnetic disk 201 is equal to that prepared in Example 10, and comprises a glass substrate 91, a recording layer having a recording track band 1 including two rows of sub-tracks formed by recording cells 99 that are arrayed regularly, the recording layer being formed on the glass substrate 91, and a protective layer 101 formed on the entire surface. The recording track band 1 is magnetized in one direction over the entire region of the magnetic disk. Information corresponding to the address number and the sector number of each recording track band is written in advance in the magnetic layer forming a isolation region.

In addition to the read head 221 and the write head 222, a tracking head 222 is mounted on the tip of the head slider 220. A two-stage actuator (not shown) actuates the head slider 220 so as to control the positions thereof.

Figure 19:
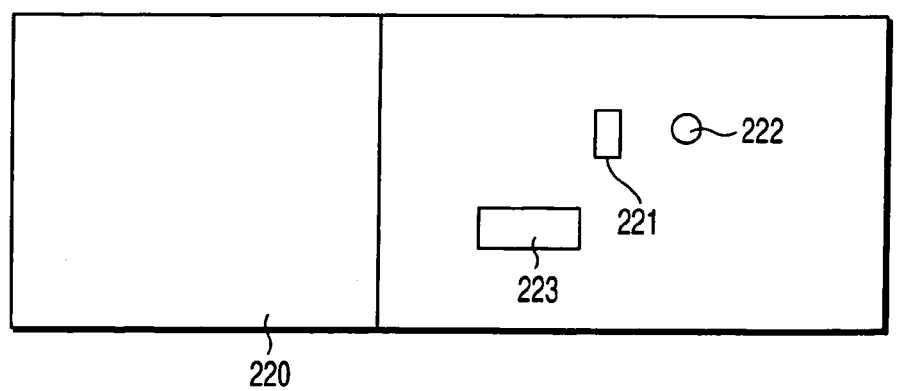
FIG. 19 schematically shows the planar construction of the head slider for Example 12 of the present invention.

FIG. 19 schematically shows the planar construction of the head slider 220. The GMR read head 221 is sized at about 20 nm×about 15 nm, and the single magnetic pole write head 222 is circular and has a size of about 20 nm. Further, the GMR tracking head 223 is sized at about 40 nm×about 20 nm.

Figure 20A:
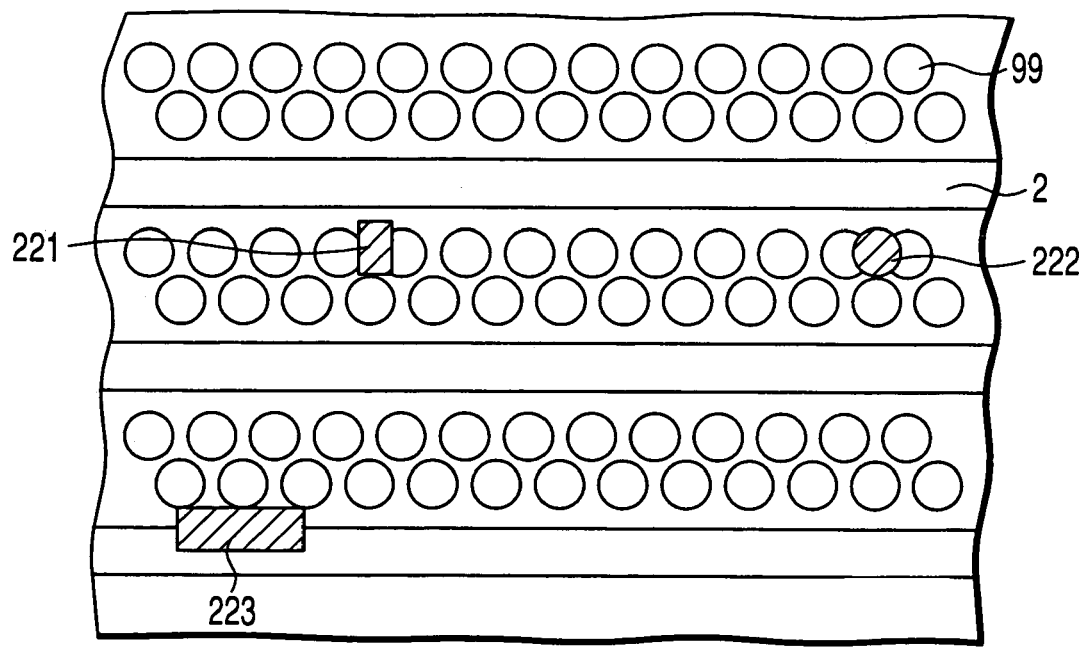
FIGS. 20A and 20B show the arrangements of the read head, the write head and the tracking head relative to the recording track band in Example 12 of the present invention.
Figure 20B:
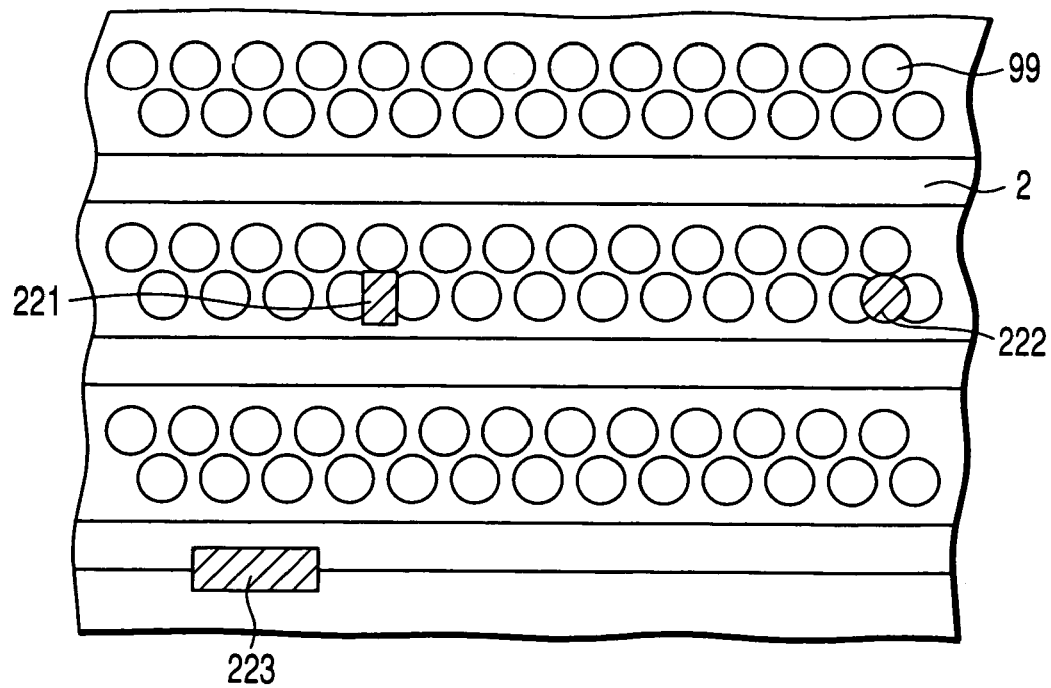

FIGS. 20A and 20B show the arrangement of the read head, the write head and the tracking head relative to the recording track band. As shown in these drawings, the tracking head 223 is arranged over the magnetic film forming the isolation region 2 of the magnetic disk so as to read the signal generated from the isolation region 2, thereby performing tracking so as to position the read head and the write head. In this case, the particular operation utilizes the phenomenon that the change in signals detected by the tracking head 223 corresponds to the deviation of the read head 221 from the sub-tracks.

Example 13

A method of manufacturing a phase change optical recording medium for this Example will now be described with reference to FIGS. 21A to 21D.

Figure 21A:
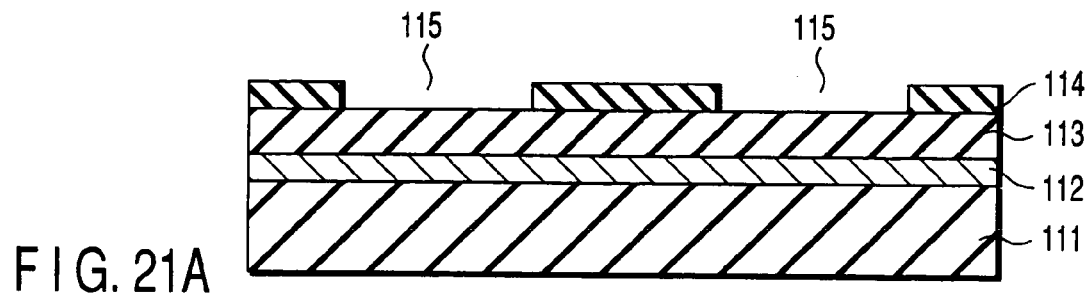
FIGS. 21A to 21D are cross-sectional views showing a method of manufacturing a phase change optical recording medium for Example 13 of the present invention.

As shown in FIG. 21A, a groove structure is formed on a substrate as follows. Specifically, formed successively on a glass disk substrate 111 of 2.5 inches are a Pt reflective film 112 having a thickness of about 30 nm, an $Al_2O_3$ film 113 having a thickness of about 50 nm, which forms a matrix, and a $SiO_2$ film 114 having a thickness of about 50 nm in the order mentioned. After a resist film is formed on the $SiO_2$ film 114 by spin coating, the resist film is processed by optical lithography so as to form a resist pattern in which a spiral groove having a width of about 200 nm is defined by a convex portion having a width of about 200 nm. Then, the $SiO_2$ film 114 is etched with the resist pattern used as a mask so as to transfer the groove 115 to the $SiO_2$ film 114.

Figure 21B:
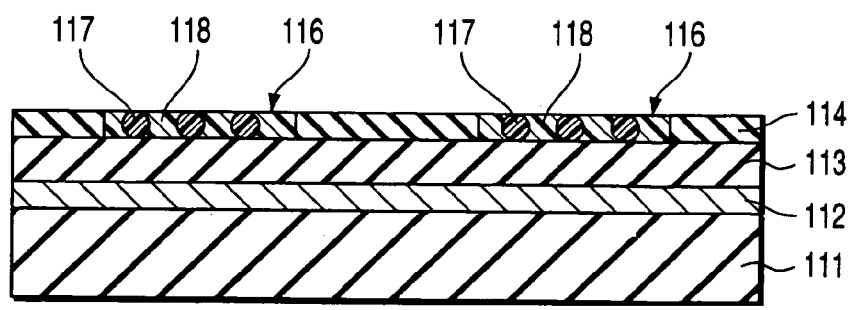

As shown in FIG. 21B, the groove region is filled with a block copolymer to form a regular array structure of fine particles as follows. Specifically, prepared is a solution by dissolving a polystyrene-polymethyl methacrylate block copolymer (PS having a molecular weight Mw of 80,000 and PMMA having a molecular weight Mw of 20,000) in toluene in a concentration of 1% w/w. Then, The substrate is spin coated with the solution thus prepared so as to fill the groove region transferred to the $SiO_2$ film 114 with the block copolymer 116. Further, the substrate is annealed at 150° C. for 30 hours under vacuum so as to regularly array the block copolymer 116. As a result, formed is a structure in which island-like PMMA particles 117 are surrounded by a sea-like PS portion 118.

Figure 21C:
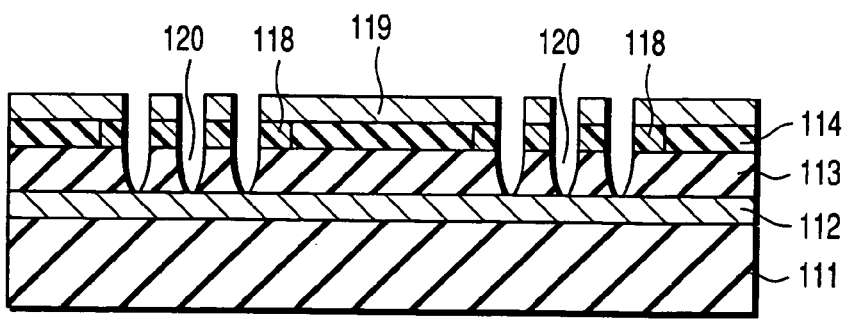

As shown in FIG. 21C, a pore structure for the recording cells is formed as follows. Specifically, the block copolymer 116 is treated with ultraviolet light, followed by washing with water. Then, a Cr layer 119 is formed by oblique vapor deposition. After formation of the Cr layer 119, holes extending to reach the $Al_2O_3$ layer 113 are formed by RIE, followed by transferring holes 120 to the $Al_2O_3$ layer by Ar ion milling so as to form a matrix consisting of the $Al_2O_3$ film 113.

Figure 21D:
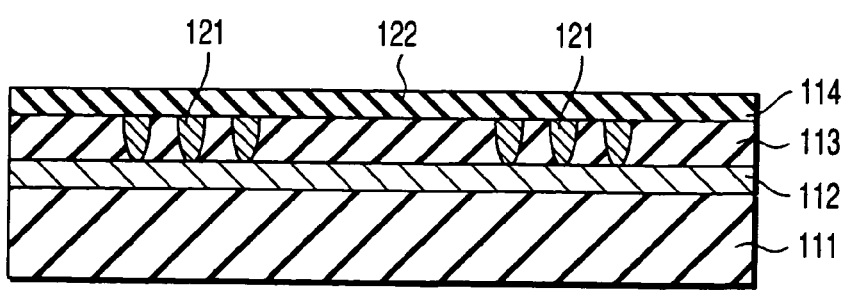

Further, as shown in FIG. 21D, recording cells are formed and the surface thereof is planarized as follows. Specifically, a film of a phase change material In—Sb—Te is deposited in a thickness of about 30 nm so as to fill the holes 120, thereby forming the recording cells 121. Further, the surface is subjected to CMP, followed by forming a $SiO_2$ film on the entire surface so as to form the protective film 122.

Figure 22:
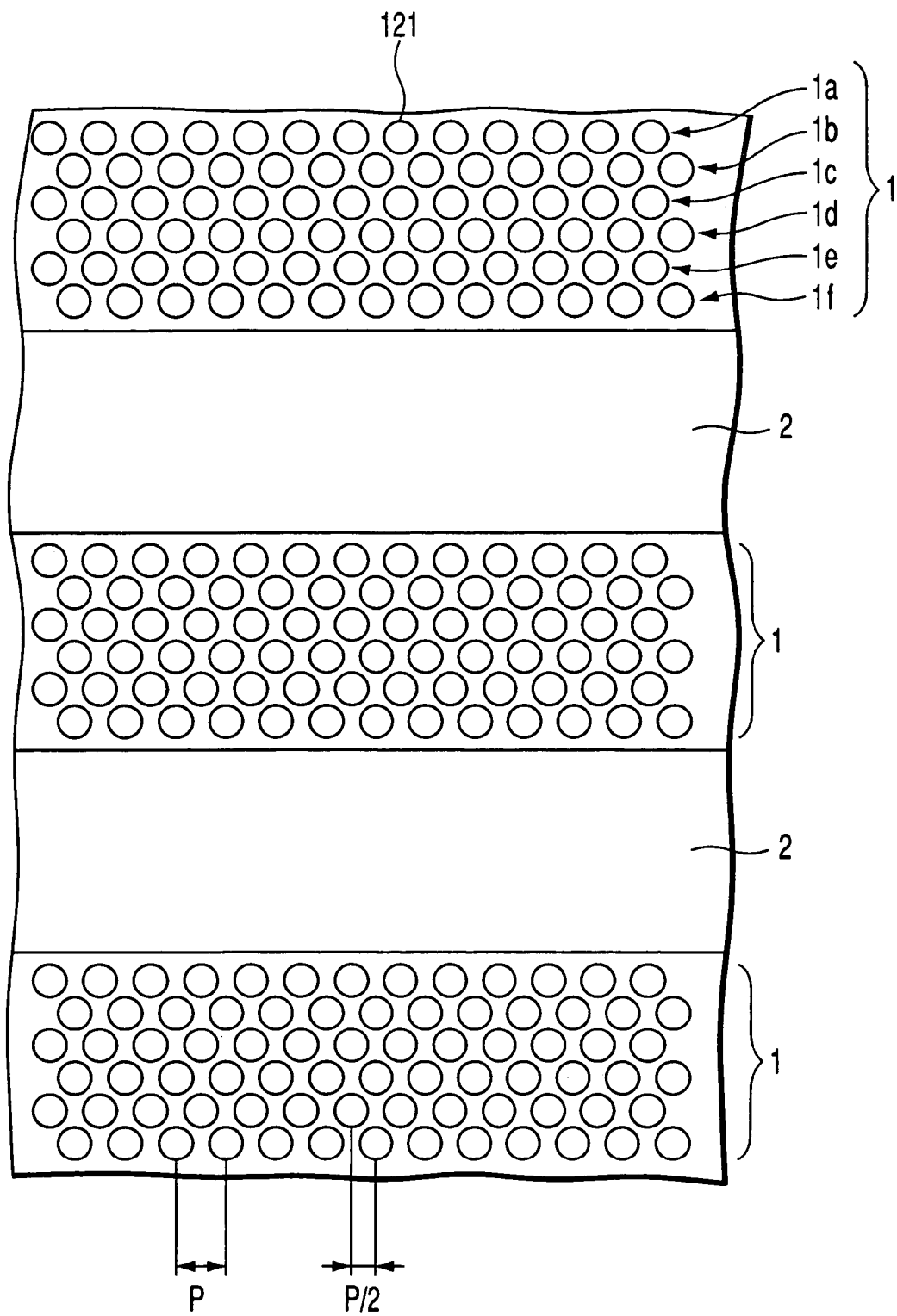
FIG. 22 is a plan view of the phase change optical recording medium for Example 13 of the present invention.

FIG. 22 schematically shows the result of observation of the phase change optical recording medium thus manufactured with a near-field optical microscope. As shown in FIG. 22, recording track bands 1 each having a width of about 200 nm and isolation regions 2 made of $Al_2O_3$ film 113 having a width of about 200 nm are formed alternately. The recording cells 121 form a hexagonal close-packed structure within a single recording track band 1 and, thus, form a triangular lattice. The recording cells 199 are periodically arrayed with a pitch P in the track direction so as to form a sub-track, and six rows of the sub-tracks 1a to 1f are included in the recording track band 1. The nearest neighboring two recording cells 121 positioned on adjacent two sub-tracks are deviated such that the distance in the track direction between the center of the recording cell 121 in one sub-track and the center of the recording cell 121 in the adjacent sub-track is equal to ½ of the pitch P of the recording cells forming the sub-track.

Example 14

A phase change optical recording apparatus for this Example will now be described with reference to FIGS. 23 and 24.

Figure 23:
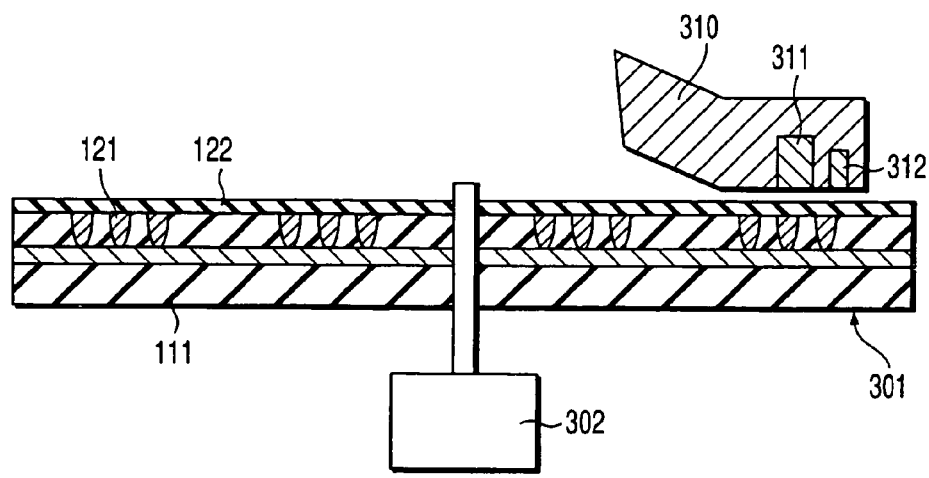
FIG. 23 is a cross-sectional view showing the phase change optical disk and the head slider for Example 14 of the present invention.

Specifically, FIG. 23 is a cross-sectional view showing the constructions of a phase change optical disk 301 and the head slider. As shown in the drawing, the optical disk 301 is mounted on a spindle motor 302 and is rotated according to control signals supplied from a control section (not shown). The optical disk 301 is equal to that prepared in Example 13, and comprises a glass substrate 111, a recording layer having a recording track band in which the recording cells 121 are regularly arrayed, the recording layer being formed on the glass substrate 111, and a protective layer 122 formed on the entire surface.

A laser resonance type optical detection read head 311 and a planar oscillation type laser write head 312 are mounted on tip of the head slider 310. A two-stage actuator (not shown) actuates the head slider 310 so as to control the positions thereof.

Figure 24:
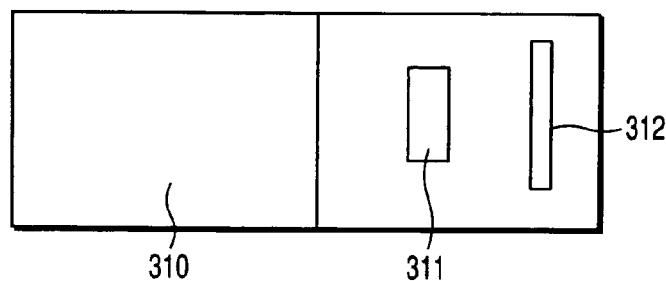
FIG. 24 schematically shows the planar construction of the head slider for Example 14 of the present invention.

FIG. 24 schematically shows the planar construction of micro apertures formed in the front surface of each head of the head slider 311. The micro aperture of the read head 311 is sized at about 40 nm×about 20 nm, and the micro aperture of the write head 312 is sized at about 60 nm×about 10 nm.

It is possible to perform tracking of the read head and operation to avoid writing to a defective region in this Example by the method similar to that for Example 11.

Example 15

Figure 25:
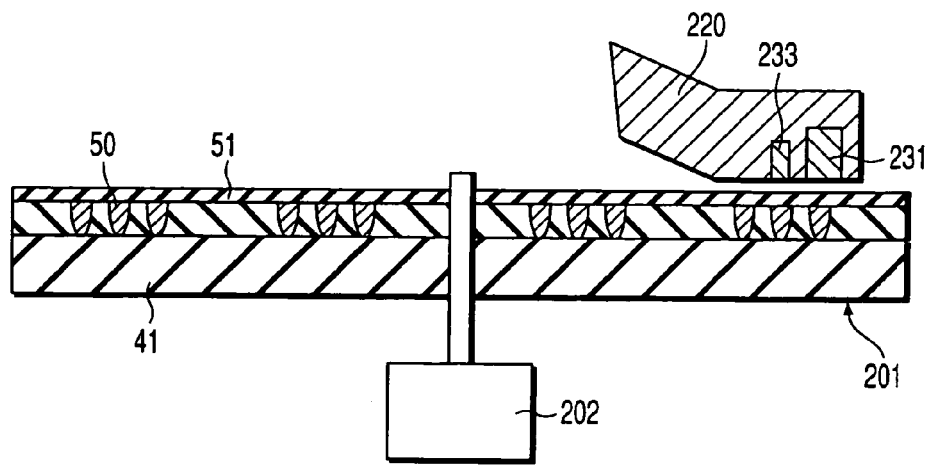
FIG. 25 is a cross-sectional view showing the magnetic disk and the head slider for Example 15 of the present invention.
Figure 26:
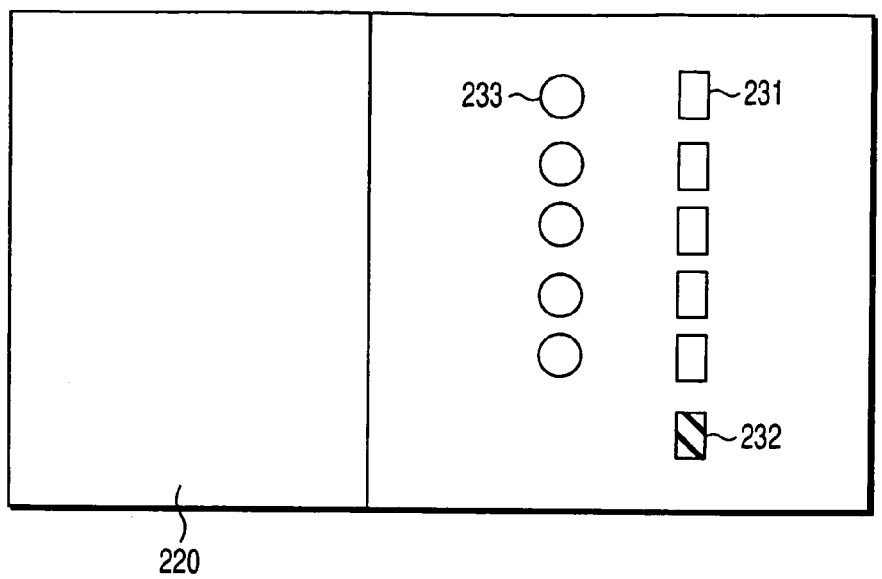
FIG. 26 schematically shows the planar construction of the head slider for Example 15 of the present invention.
Figure 27:
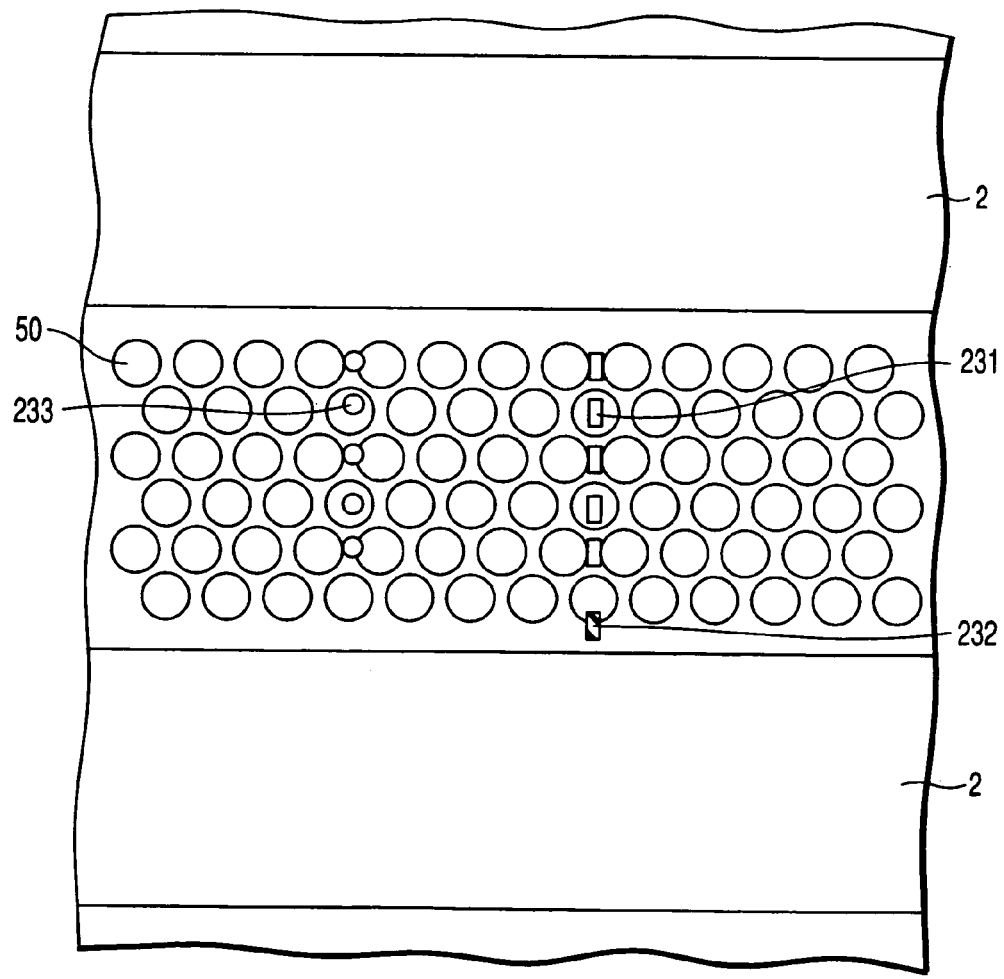
FIG. 27 shows the arrangement of the read head, the write head and the tracking head relative to the recording track band for Example 15 of the present invention.

A magnetic recording apparatus for this Example will now be described with reference to FIGS. 25 to 27. Specifically, FIG. 25 is a cross-sectional view showing the constructions of the magnetic disk 201 and the head slider 220. FIG. 26 schematically shows the planar construction of the head slider 220. Further, FIG. 27 shows the arrangement of read head, the write head and the tracking head relative to the recording track band.

As shown in FIG. 25, the magnetic disk 201 is mounted on a spindle motor 202 and is rotated according to control signals supplied from a control section (not shown). The magnetic disk 201 is equal to that prepared in Example 5, and comprises a glass substrate 41, a recording layer formed on the glass substrate 41, and a protective layer 51 formed on the entire surface. The recording layer noted above comprises a recording track band 1 including six rows of sub-tracks formed of recording cells 50 that are arrayed regularly.

Read heads 231, a tracking head 232 and write heads 233 are mounted on the tip of the head slider 220. A two-stage actuator (not shown) actuates the head slider 220 so as to control the positions thereof.

As shown in FIG. 26, used in this Example is a multi-channel head including five GMR read heads 231 arranged in a manner to correspond to the five rows of the sub-tracks and each sized at about 20 nm×about 15 nm, a GMR tracking head 232 sized at 20 nm×about 15 nm and arranged to correspond to the sixth line of the sub-track, and five circular single magnetic pole write heads 233 each having a size of 20 nm arranged to correspond to the five rows of the sub-tracks like the read heads 231.

As shown in FIG. 27, tracking signals are detected in this Example by the tracking head 232 from the recording cells on the sixth sub-track that is positioned at the edge of the recording track band 1 so as to position of the read heads and the write heads. In this Example, it is possible to confirm instantly write signals by the read heads 231.

Example 16

Figure 28:
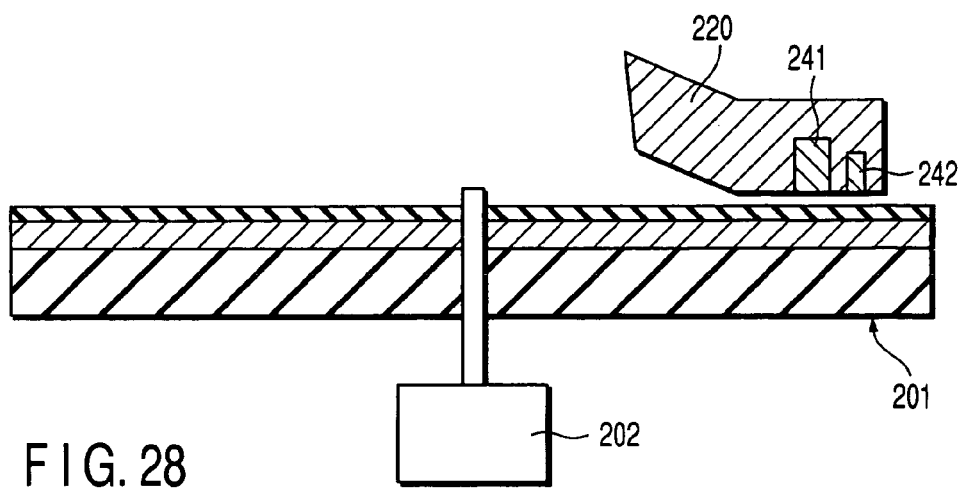
FIG. 28 is a cross-sectional view showing the magnetic disk and the head slider for Example 16 of the present invention.
Figure 29:
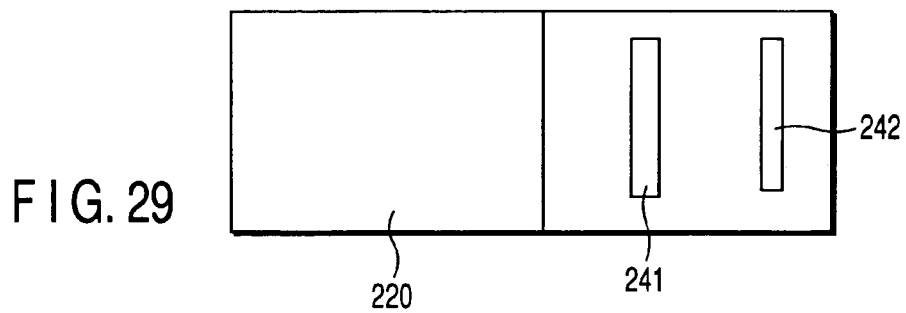
FIG. 29 schematically shows the planar construction of the head slider for Example 16 of the present invention.
Figure 30:
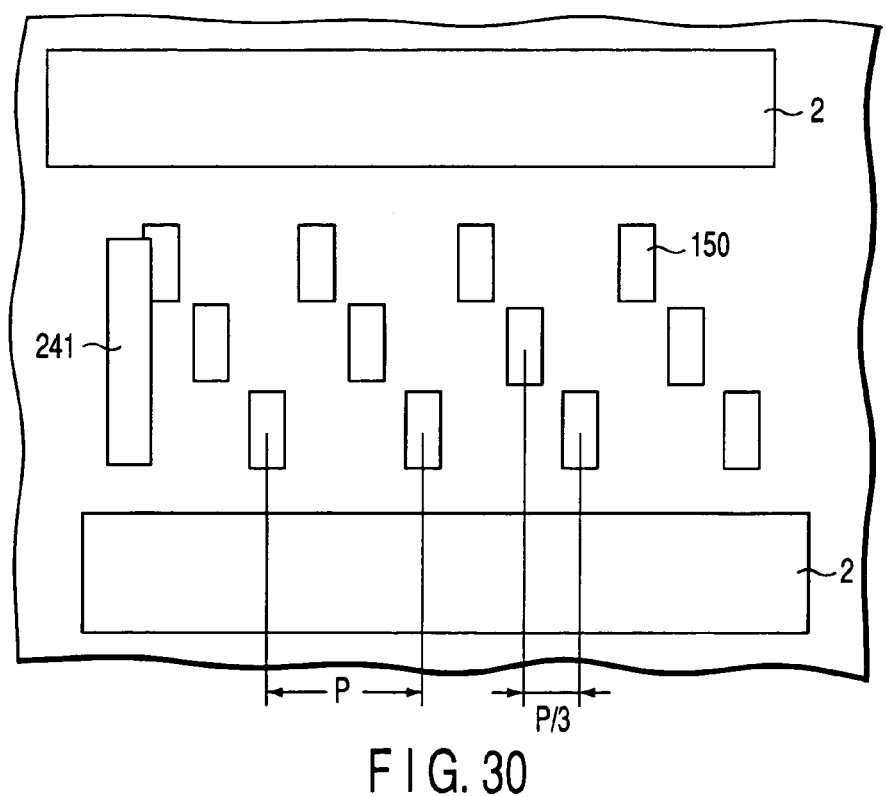
FIG. 30 shows the arrangement of the read head, the write head and the tracking head relative to the recording track band for Example 16 of the present invention.

A magnetic recording medium for this Example will now be described with reference to FIGS. 28 to 30. FIG. 28 is a cross-sectional view showing the constructions of the magnetic disk and the head slider. FIG. 29 schematically shows the planar construction of the head slider. Further, FIG. 30 shows the arrangement of the read head, the write head and the tracking head relative to the recording track band.

As shown in FIG. 28, the magnetic disk 201 is mounted on the spindle motor 202 and is rotated according to control signals generated from a control section (not shown). The magnetic disk 201 is prepared by nano-imprinting using a master disk manufactured as in Example 8. As shown in FIG. 30, rectangular recording cells 150 each sized at 30 nm×15 nm are regularly arrayed within the recording track band 1 to form three rows of sub-tracks on the magnetic disk 201. The recording cells 150 are arrayed at a pitch P in the track direction to form a sub-track. It should be noted that the nearest neighboring two recording cells 150 positioned on adjacent two sub-tracks are deviated by a distance equal to ⅓ of the pitch P noted above.

A read head 241 and a write head 242 are mounted on the tip of the head slider 220. A two-stage actuator (not shown) actuates the head slider 220 so as to control the positions thereof.

As shown in FIG. 29, the read head 241 is sized at about 90 nm×about 15 nm, and the write head 242 is sized at about 110 nm×about 15 nm.

As shown in FIG. 30, the single read head 241 reads the recording cells 150 on three rows of sub-tracks regularly arrayed at a predetermined pitch within the recording track band 1. The size of the read head 241 noted above is designed to meet the conditions given below. Specifically, the read head 241 has a width in the track direction of 15 nm, which is smaller than the distance in the track direction between the centers of the nearest neighboring recording cells on adjacent two sub-tracks, and has a length of 90 nm in the radial direction of the disk, which is larger than the distance in the radial direction between the centers of the nearest neighboring two recording cells on adjacent two sub-tracks and smaller than the maximum width of the three rows of the sub-tracks.

In this Example, it is possible to perform tracking by controlling the position of the head slider such that the signals generated from two of the three rows of sub-tracks are allowed to have the same intensity.

Example 17

A method of manufacturing a charge-storing recording medium for this Example will now be described with reference to FIGS. 31A to 31D.

Figure 31A:
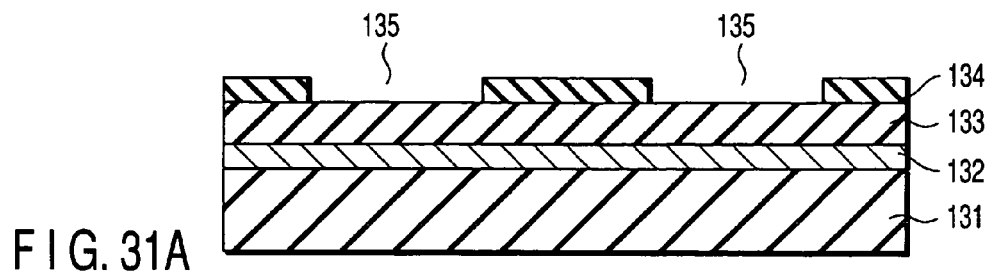
FIGS. 31A to 31D are cross-sectional views showing a method of manufacturing the charge-storing recording medium for Example 17 of the present invention.

As shown in FIG. 31A, a groove structure is formed on a substrate as follows. Specifically, formed successively on a glass disk substrate 131 of 2.5 inches are an Au underlying electrode 132 having a thickness of about 30 nm, an $Al_2O_3$ film 133 having a thickness of about 50 nm, which forms a matrix and an isolation region, and a $SiO_2$ film 134 having a thickness of about 50 nm in the order mentioned. After a resist film is formed on the $SiO_2$ film 134 by spin coating, the resist film is processed by optical lithography so as to form a resist pattern in which a spiral groove having a width of about 200 nm is defined by a convex portion having a width of about 200 nm. Then, the $SiO_2$ film 134 is etched with the resist pattern used as a mask so as to transfer the groove 135 to the $SiO_2$ film 134.

Figure 31B:
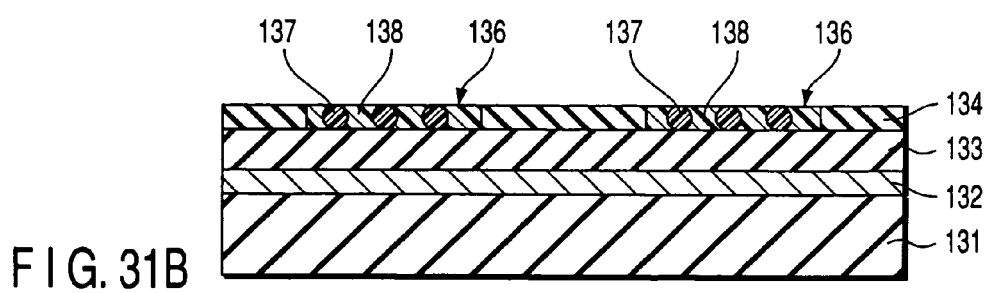

As shown in FIG. 31B, the groove region is filled with a block copolymer to form a regular array structure of fine particles as follows. Specifically, prepared is a solution by dissolving a polystyrene-polymethyl methacrylate block copolymer (PS having a molecular weight Mw of 80,000 and PMMA having a molecular weight Mw of 20,000) in toluene in a concentration of 1% w/w. Then, the substrate is spin coated with the solution thus prepared so as to fill the groove region transferred to the $SiO_2$ film 134 with the block copolymer 136. Further, the substrate is annealed at 150° C. for 30 hours under vacuum so as to regularly array the block copolymer 136. As a result, formed is a structure in which island-like PMMA particles 137 are surrounded by a sea-like PS portion 138.

Figure 31C:
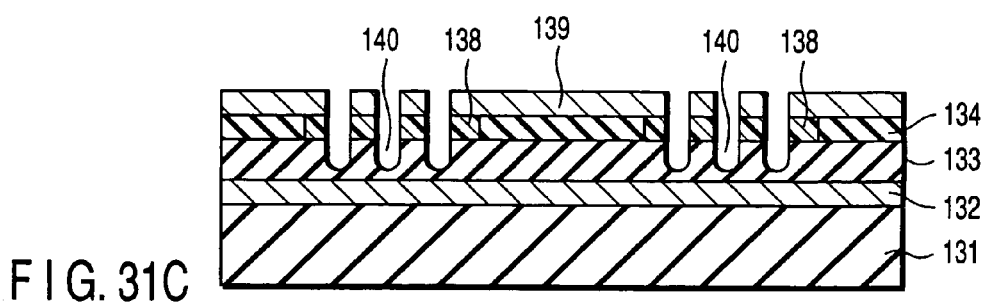

As shown in FIG. 31C, a pore structure for the recording cells is formed as follows. Specifically, the block copolymer 136 is treated with ultraviolet light, followed by washing with water. Then, a Cr layer 139 is formed by oblique vapor deposition. After formation of the Cr layer 139, holes extending to reach the Al$_2$O$_3$ layer 133 are formed by RIE, followed by transferring holes 140 having a depth of about 10 nm to the Al$_2$O$_3$ layer by Ar ion milling so as to form a matrix consisting of the Al$_2$O$_3$ film 133.

Figure 31D:
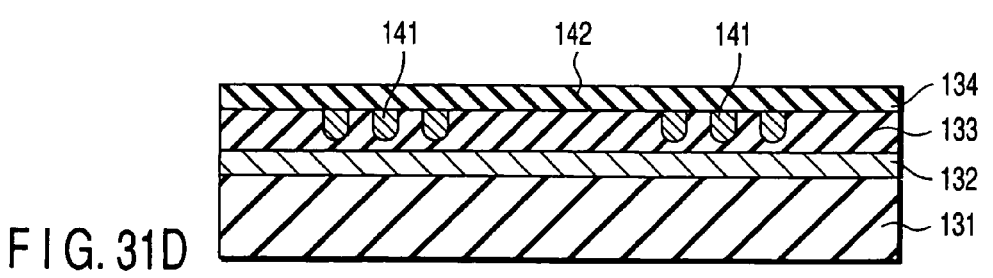

Further, as shown in FIG. 31D, recording cells are formed and the surface thereof is planarized as follows. Specifically, an Au film as a charge-storing material is deposited in a thickness of about 10 nm so as to fill the holes 140, thereby forming the recording cells 141. Further, the surface is subjected to CMP, followed by forming a SiO$_2$ film on the entire surface so as to form the protective film 142.

Figure 32:
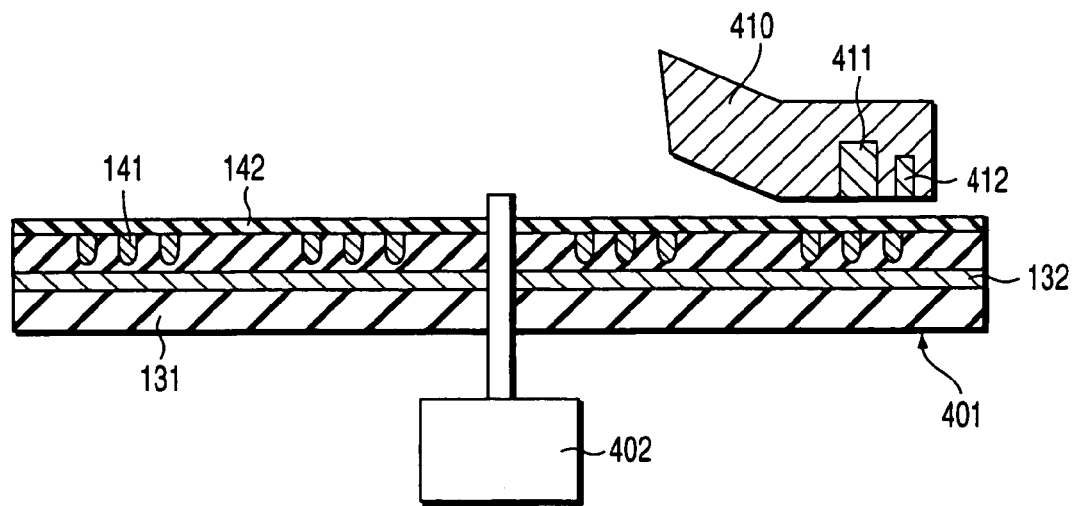
FIG. 32 is a cross-sectional view showing the charge-storing recording medium and the head slider for Example 17 of the present invention.

A charge-storing recording apparatus for this Example will now be described with reference to FIGS. 32 and 33. FIG. 32 is a cross-sectional view showing the constructions of the recording disk of charge-storing medium and the head slider. As shown in the drawing, the recording disk 401 is mounted on a spindle motor 402 and is rotated according to control signals supplied from a control section (not shown). The underlying electrode 132 is electrically contacted to outside making it possible to apply a voltage to the underlying electrode 132. A SET sensor 411 as a read head and a Ti electrode 412 whose end is sharpened to about 10 nm φ as a write head are mounted on tip of the head slider 410. A pulsed minus voltage is applied to the Ti electrode 412 so as to emit electrons to the recording cells 141 as charge-storing areas, thereby performing writing.

Figure 33:
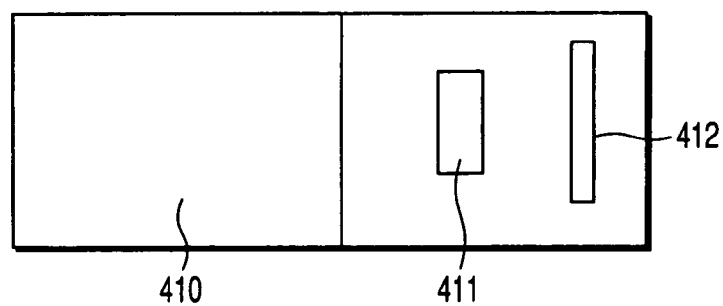
FIG. 33 schematically shows the planar construction of the head slider for Example 17 of the present invention.

FIG. 33 schematically shows the planar construction of the head slider 410. The SET sensor 411 and the Ti electrode 412 are mounted on tip of the head slider.

It is possible to perform tracking of the read head and operation to avoid writing to a defective region in this Example by the method similar to that for Example 11.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a recording medium, comprising:
    forming on a disk substrate a continuous or intermittent groove region or a band region containing a specified chemical component concentrically or spirally, which corresponds to a recording track band, the groove region or the band region being defined by isolation regions formed concentrically or spirally;
    forming a two-dimensional regular array structure of self-ordering molecules or fine particles in the groove region or the band region; and
    forming recording cells corresponding to the regular array structure including
    forming a recording layer on the disk substrate,
    forming a first film on the recording layer,
    patterning the first film to form a concentric or spiral pattern corresponding to the isolation regions and a concentric or spiral groove region corresponding to the recording track band,
    forming a two-dimensional regular array structure of self-ordering molecules or fine particles in the groove region,
    etching the recording layer using the concentric or spiral pattern of the first film and the self-ordering molecules or fine particles as a mask to form the isolation regions made of the recording layer and the recording cells; and
    forming a non-recording material between the recording cells.

2. The method according to claim 1, wherein the continuous or intermittent groove region or the band region containing a specified chemical component, which corresponds to the recording track band, is formed on the substrate by optical lithography, electron beam lithography or nano-imprinting lithography.

3. The method according to claim 1, wherein the recording cells form a plurality of rows of sub-tracks.

4. The method according to claim 3, wherein the recording cells included in each sub-track are formed apart from each other at a pitch P in the track direction, and wherein nearest neighboring two recording cells, each positioned on adjacent two sub-tracks in the recording track band, are formed apart from each other at a pitch P/n in the track direction, where $2 \leq n \leq 5$.

5. The method according to claim 1, wherein the recording cells form a hexagonal close-packed structure.

6. The method according to claim 4, wherein the recording cell has a size of 2 to 200 nm, and the pitch P between the recording cells is 2 to 200 nm.

7. The method according to claim 1, wherein the isolation regions are formed of a non-recording material.

8. The method according to claim 1, wherein the isolation regions are formed of a recording material equal to the material of the recording cells.

9. The method according to claim 8, wherein the recording cells are formed of a magnetic recording material.

10. The method according to claim 1, wherein the groove region defined by the isolation regions is filled with a block copolymer, followed by self-ordering the block copolymer.

11. The method according to claim 1, further comprising:
    forming a stamp master having irregularity;
    forming a recording layer on the disk substrate;
    forming a resist layer on the recording layer;
    transferring the irregularity of the stamp master to the resist layer; and
    etching the recording layer using the remaining resist layer as a mask to form the recording cells.

* * * * *